US008990443B2

(12) United States Patent
Toda et al.

(10) Patent No.: US 8,990,443 B2
(45) Date of Patent: Mar. 24, 2015

(54) COMPUTER SYSTEM AND MANAGEMENT SERVER

(75) Inventors: Masaru Toda, Yokohama (JP); Isamu Hosono, Yokohama (JP); Tomohito Uchida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/993,561

(22) PCT Filed: May 26, 2011

(86) PCT No.: PCT/JP2011/062085
§ 371 (c)(1),
(2), (4) Date: Jun. 12, 2013

(87) PCT Pub. No.: WO2012/081270
PCT Pub. Date: Jun. 21, 2012

(65) Prior Publication Data
US 2013/0268695 A1    Oct. 10, 2013

(30) Foreign Application Priority Data

Dec. 14, 2010    (JP) .................................. 2010-278580

(51) Int. Cl.
G06F 3/00    (2006.01)
G06F 9/44    (2006.01)
G06F 13/10    (2006.01)
G06F 13/14    (2006.01)

(52) U.S. Cl.
CPC .............. G06F 9/4411 (2013.01); G06F 13/10 (2013.01); G06F 13/14 (2013.01)
USPC .......................................................... 710/8

(58) Field of Classification Search
None
See application file for complete search history.

(56) References Cited

U.S. PATENT DOCUMENTS

2006/0209722 A1    9/2006    Takeo et al.
2008/0147937 A1    6/2008    Freimuth et al.
(Continued)

FOREIGN PATENT DOCUMENTS

JP    2006-195870 A    7/2006
JP    2008-152787 A    7/2008
(Continued)

OTHER PUBLICATIONS

International Search Report and Written Opinion, PCT/JP2011-062085, Jul. 5, 2011, 12 pages.

*Primary Examiner* — Idriss N Alrobaye
*Assistant Examiner* — Dayton Lewis-Taylor
(74) *Attorney, Agent, or Firm* — Foley & Lardner LLP

(57) ABSTRACT

A computer system includes an I/O switch connected to a computer and changing connections between the computer and I/O devices, and a management server for managing configuration of the I/O devices. The management server, with respect to existing I/O devices connected to the I/O switch, stores information representing logical configuration of the existing I/O devices recognized by an OS of the computer and information representing physical configuration of the existing I/O devices managed by the I/O switch in the memory, The management server, upon receipt of a notice indicating a change in the configuration of the existing I/O devices from the I/O switch, changes the physical configuration of the existing I/O devices after the change in the configuration to be matched with the logical configuration of the existing I/O devices and instructs the I/O switch to change the connections in accordance with the changed physical configuration.

6 Claims, 23 Drawing Sheets

(56) References Cited

U.S. PATENT DOCUMENTS

2008/0313362 A1 12/2008 Takamoto
2009/0187675 A1* 7/2009 Kinoshita et al. .............. 710/8
2009/0287799 A1* 11/2009 Tameshige et al. ........... 709/220
2010/0211717 A1 8/2010 Uehara et al.

FOREIGN PATENT DOCUMENTS

| JP | 2008-310489 A | 12/2008 |
| JP | 2009-294828 A | 12/2009 |
| JP | 2010-191814 A | 9/2010 |

* cited by examiner

FIG. 4

| SERVER APPARATUS IDENTIFIER 401 | PROCESSOR CONFIGURATION 402 | MEMORY CAPACITY 403 | CONNECTED I/O SWITCH IDENTIFIER 404 | ASSIGNED I/O SWITCH PORT NUMBER 405 |
|---|---|---|---|---|
| HOST0 | PROCESSOR 1 2GHz × 2 | 4GB | SW1 | PORT 0 |
| | | | SW1 | PORT 1 |
| | | | SW1 | PORT 4 |
| | | | SW1 | PORT 5 |
| HOST1 | PROCESSOR 1 1GHz | 2GB | SW1 | PORT 2 |
| | | | SW1 | PORT 3 |
| | | | SW1 | PORT 6 |
| | | | SW1 | PORT 7 |

106

| SERVER APPARATUS IDENTIFIER 601 | PORT NUMBER 602 | CONNECTED DEVICE 603 | DEVICE NAME 604 | LOGICAL DEVICE NAME 605 | HARDWARE IDENTIFICATION INFORMATION 606 | SOFTWARE IDENTIFICATION INFORMATION 607 |
|---|---|---|---|---|---|---|
| HOST 0 | 1 | HBA | sda | s0 | h1 | s1 |
| HOST 0 | 5 | NIC | eth0 | n0 | MAC2 | — |
| HOST 1 | 2 | NIC | eth0 | n0 | MAC1 | — |
| HOST 1 | 7 | HBA | sda | n0 | h4 | s4 |

| I/O SWITCH IDENTIFIER | SERVER-SIDE PORT NUMBER | PCI CONFIGURATION TREE-BASED RECOGNITION ORDER | PORT NUMBER | DEVICE STATE | ATTRIBUTE |
|---|---|---|---|---|---|
| SW1 | 0 | 0 | b | PHYSICAL DEVICE | NORMAL |
| SW1 | 0 | 1 | c | VIRTUAL DEVICE | CLOSED |
| SW1 | 0 | 2 | d | PHYSICAL DEVICE | NORMAL |
| SW1 | 0 | 3 | — | | — |
| SW1 | 0 | 4 | — | | — |
| SW1 | 0 | 5 | — | | — |
| SW1 | 0 | 6 | — | | — |
| SW1 | 0 | 7 | — | | — |
| SW1 | 1 | 0 | e | PHYSICAL DEVICE | NORMAL |
| SW1 | 1 | 1 | h | PHYSICAL DEVICE | NORMAL |
| SW1 | 1 | 2 | — | | — |
| SW1 | 1 | 3 | — | | — |
| SW1 | 1 | 4 | — | | — |
| SW1 | 1 | 5 | — | | — |
| SW1 | 1 | 6 | — | | — |
| SW1 | 1 | 7 | — | | — |

1501  1502  1503  1504  1505  1506

| I/O SWITCH IDENTIFIER | PORT NUMBER | DEVICE TYPE | UNIQUE INFORMATION | HARDWARE INFORMATION | SOFTWARE INFORMATION | INTENDED USE | UPDATE TIME |
|---|---|---|---|---|---|---|---|
| SW1 | a | — | — | — | — | — | — |
| SW1 | b | NIC | MAC1 | hn1 | sn1 | MIRRORING | t1 |
| SW1 | c | HBA | WWWN2 | hn2 | sn2 | MIRRORING | t2 |
| SW1 | d | HBA | WWWN3 | hn3 | sn3 | — | t3 |
| SW1 | e | NIC | MAC4 | hn4 | sn4 | — | t4 |
| SW1 | f | — | — | — | — | — | — |
| SW1 | g | — | — | — | — | — | — |
| SW1 | h | HBA | WWWN7 | hn7 | sn7 | — | t7 |

COMPUTER SYSTEM AND MANAGEMENT SERVER

CROSS-REFERENCE TO RELATED PATENT APPLICATIONS

The present application claims priority from Japanese patent application No. 2010-278580 filed on Dec. 14, 2010, the content of which is hereby incorporated by reference into this application.

BACKGROUND OF THE INVENTION

This invention relates to a computer system and a management server.

In recent years, PCI Express Switches (hereinafter, referred to as PCIeSW) are becoming more common in practical use; the number of PCI devices that can be mounted on a single computer has increased ten times as many as before. Such PCI devices support various functions including hot plug; accordingly, it is easy to add or replace a PCI device for a computer.

Various techniques related to the PCI device are disclosed (for example, refer to Patent Literature 1, Patent Literature 2, and Patent Literature 3).
Patent Literature 1: JP 2006-195870 A
Patent Literature 2: JP 2009-294828 A
Patent Literature 3: JP 2008-152787A

SUMMARY OF THE INVENTION

The above-listed techniques, however, have a problem that, when a PCI device for a computer is added or replaced, the operating system (OS) installed in the computer cannot automatically and uniquely identify the type of the added or replaced PCI device.

Specific explanation is provided. In typical, when an OS starts up, it assigns device names to the mounted devices in order of number of driver or bus. However, the device configuration at the startup of the OS may be different from the device configuration at the previous startup because of addition or replacement of a PCI device. In such a case, it might happen that the OS assigns the same device a different device name from the device name at the previous startup.

To eliminate such a problem, there exists an access method that the OS makes accesses to the devices using logical device names, which are indirectly assigned to the devices, instead of using device names assigned to the devices.

This method, however, has a problem that, if hardware identification information or software identification information used in assigning the logical device names is cleared by initialization or duplicated by backup, the logical device names cannot be matched with the device names so that a device to be accessed might not be located.

This invention has been accomplished in view of the aforementioned problems and aims to provide a computer system and a management server that assure the consistency in device names of the devices, even if the device configuration at a startup of the OS is different from the previous one.

To solve the aforementioned problems, the configuration of what is claimed is employed.

This invention includes a plurality of means to the aforementioned problems. An example of this invention is a computer system including: an I/O switch connected to a computer, the I/O switch changing connections between the computer and a plurality of I/O devices; and a management server for managing configuration of the plurality of I/O devices, the management server including a processor for executing a program and a memory for storing the program to be executed by the processor. With respect to existing I/O devices connected to the I/O switch, the management server stores information representing logical configuration of the existing I/O devices recognized by an OS of the computer and information representing physical configuration of the existing I/O devices managed by the I/O switch in the memory. Upon receipt of a notice indicating a change in the configuration of the existing I/O devices from the I/O switch, the management server changes the physical configuration of the existing I/O devices after the change in the configuration to be matched with the logical configuration of the existing I/O devices and instructs the I/O switch to change the connections in accordance with the changed physical configuration.

This invention assures the consistency in device names of the devices, even if the device configuration at an OS startup is different from the previous one.

Problems, configurations, and effects other than those in the foregoing description will be clarified by the following description of embodiments.

BRIEF DESCRIPTION OF THE DRAWINGS

FIG. 4 is a diagram illustrating an example of the server management table in the first embodiment of this invention;

FIG. 15 is a diagram illustrating an example of the I/O switch server connection information table in the second embodiment of this invention;

DETAILED DESCRIPTION OF THE EMBODIMENTS

Hereinafter, embodiments of this invention are described with reference to the accompanying drawings.

First Embodiment

Figure 1:
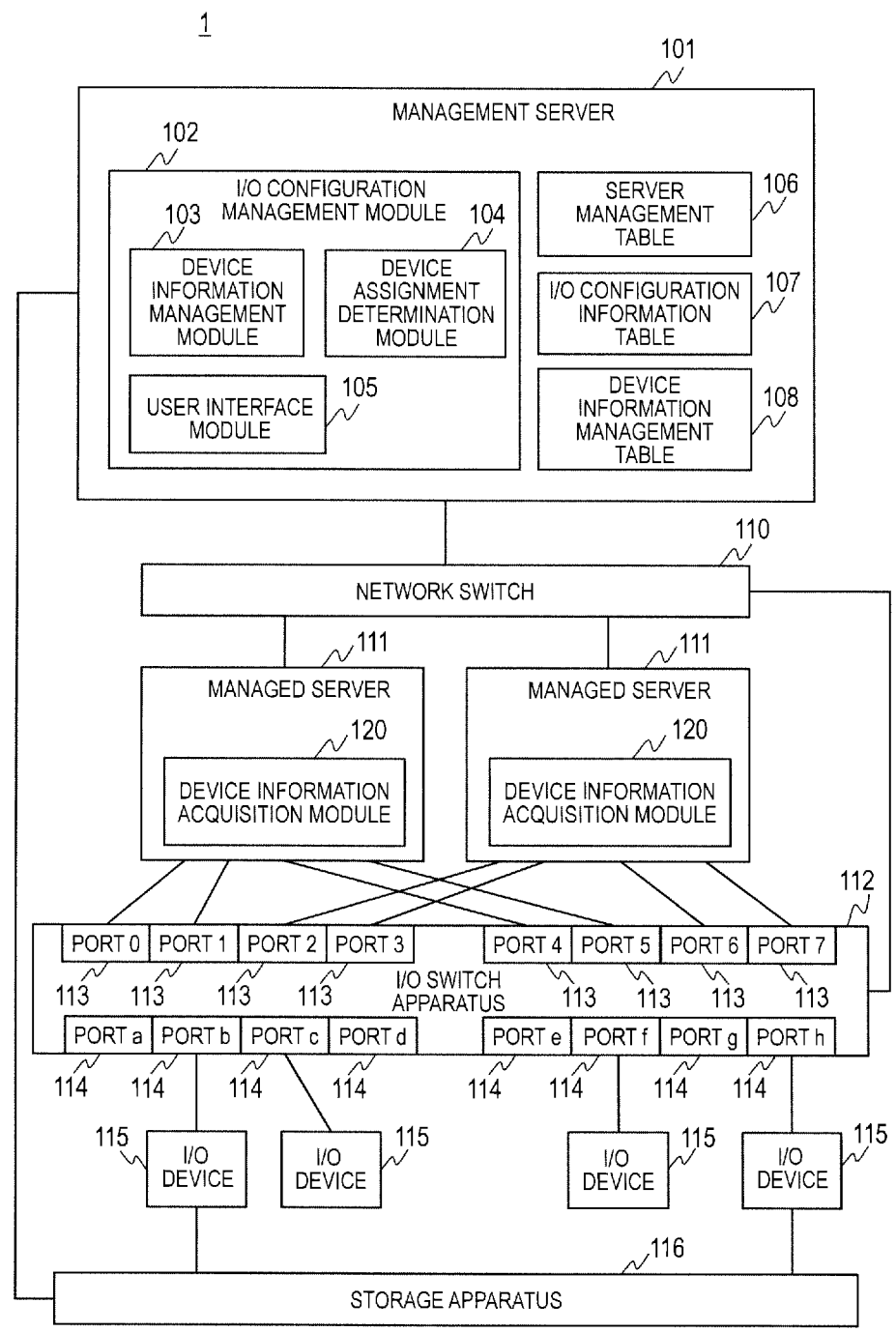
FIG. 1 is a diagram illustrating an overall configuration example of the computer system in the first embodiment of this invention.

FIG. 1 is a diagram illustrating an overall configuration example of the computer system 1 in the first embodiment of this invention. The computer system 1 shown in FIG. 1 includes a management server 101, a network switch 110, a plurality of managed servers 111, an I/O switch apparatus 112, a plurality of I/O devices 115, and a storage apparatus 116.

The management server 101 is a computer apparatus for managing the logical configuration of the I/O devices 115 recognized by the OS of the managed servers 111 and the physical configuration of the I/O devices 115 managed by the I/O switch apparatus 112 together. The management server 101 includes an I/O configuration management module 102, a server management table 106, an I/O configuration information table 107, and a device information management table 108. Each element is described later.

The management server 101 receives a notice of change in the logical configuration or the physical configuration of I/O devices 115 from a managed server 111 or the I/O switch apparatus 112, and controls the I/O switch apparatus 112 based on the received notice of change.

For example, upon receipt of a notice of change in the physical configuration indicating that a new I/O device 115 has been added, the management server 101 investigates the logical configuration of I/O devices 115 and informs the I/O switch apparatus 112 of a physical configuration matching the logical configuration of the I/O devices 115. The physical configuration matching the logical configuration of the I/O devices 115 is a physical configuration with which the logical configuration of the existing I/O devices 115 will not change even if a new I/O device 115 is added. Such a configuration eliminates the user from manually modifying the logical configuration before or after the configuration change in I/O devices 115. Specific details of the control are described later.

The network switch 110 is a communication apparatus having a function for switching communication channels and packets among the management server 101, the managed servers 111, and the I/O switch apparatus 112.

The managed servers 111 are computer apparatuses to be managed by the management server 101. Each managed server 111 includes a device information acquisition module 120 for acquiring information representing the logical configuration of I/O devices 115. The device information acquisition module 120 is described later.

The I/O switch apparatus 112 is a communication apparatus, such as a PCIeSW, including upstream ports 113 for connecting to managed servers 111 and downstream ports 114 for connecting to I/O devices 115. When the configuration of I/O devices 115 is changed because of, for example, addition of an I/O device 115, this I/O switch apparatus 112 sends information representing the physical configuration of the changed I/O device 115 to the management server 101 with a management program running on the apparatus.

The I/O devices 115 are various kinds of devices such as I/O disks connected to the I/O switch apparatus 112, SCSI (Small Computer System Interface), and network devices.

The storage apparatus 116 is an apparatus for storing various kinds of data, programs, and others. The management server 101 retrieves a program held in this storage apparatus 116 (a program for performing the function of the I/O configuration management module 102) at startup.

Figure 2:
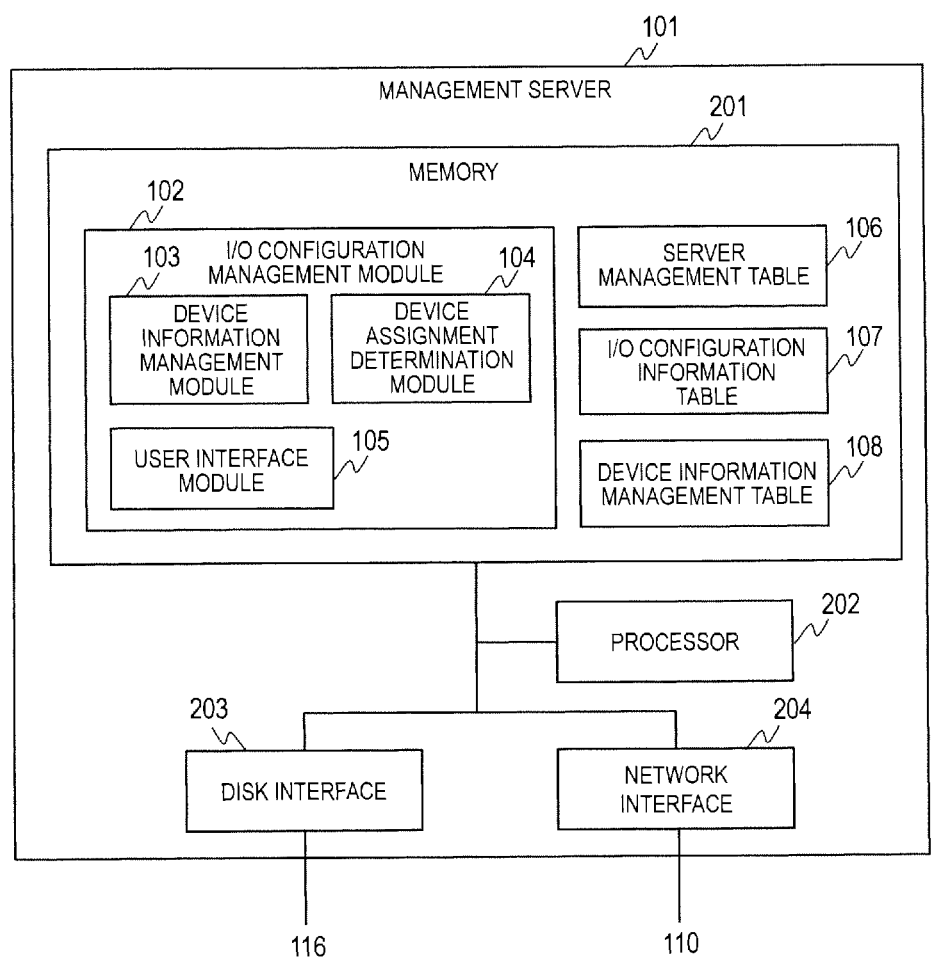
FIG. 2 is a diagram illustrating a configuration example of the management server in the first embodiment of this invention.

FIG. 2 is a diagram illustrating a configuration example of the management server 101 in the first embodiment of this invention. The management server 101 includes a memory 201, a processor 202, a disk interface 203, and a network interface 204.

The memory 201 is a storage device, such as a RAM (Random Access Memory), for retrieving and storing a program held in the storage apparatus 116 at startup of the management server 101. This program is the program for performing the function of the I/O configuration management module 102. The memory 201 also stores the server management table 106, the I/O configuration information table 107, and the device information management table 108.

The processor 202 is a CPU (Central Processing Unit) for executing the program stored in the memory 201. The disk interface 203 is an interface device for connecting to the storage apparatus 116. The network interface 204 is an interface device for connecting to the network switch 110.

The I/O configuration management module 102 includes a device information management module 103, a device assignment determination module 104, and a user interface module 105 to manage the logical configuration and the physical configuration of I/O devices 115.

The device information management module 103 manages information on I/O devices 115 (information representing the logical configuration and the physical configuration of I/O devices 115). The device assignment determination module 104 determines the port to be assigned each I/O device 115 when the configuration of I/O devices 115 has been changed. Details of these device information management module 103 and device assignment determination module 104 are described later with reference to FIGS. 9 and 7.

The user interface module 105 receives input of an instruction by the user. The instruction here is, in the case of addition of an I/O device 115 connected to the I/O switch 112, an instruction designating the managed server 111 the added I/O device 115 is to be connected to.

The server management table 106 is a table for managing the configuration of managed servers 111. The I/O configuration information table 107 is a table for storing information representing the physical configuration of the I/O devices 115 connected to the I/O switch apparatus 112. The device information management table 108 is a table for storing information representing the logical configuration of the I/O devices 115 recognized by the OS of each managed server 111. These tables are described later with reference to FIGS. 4 to 6.

Figure 3:
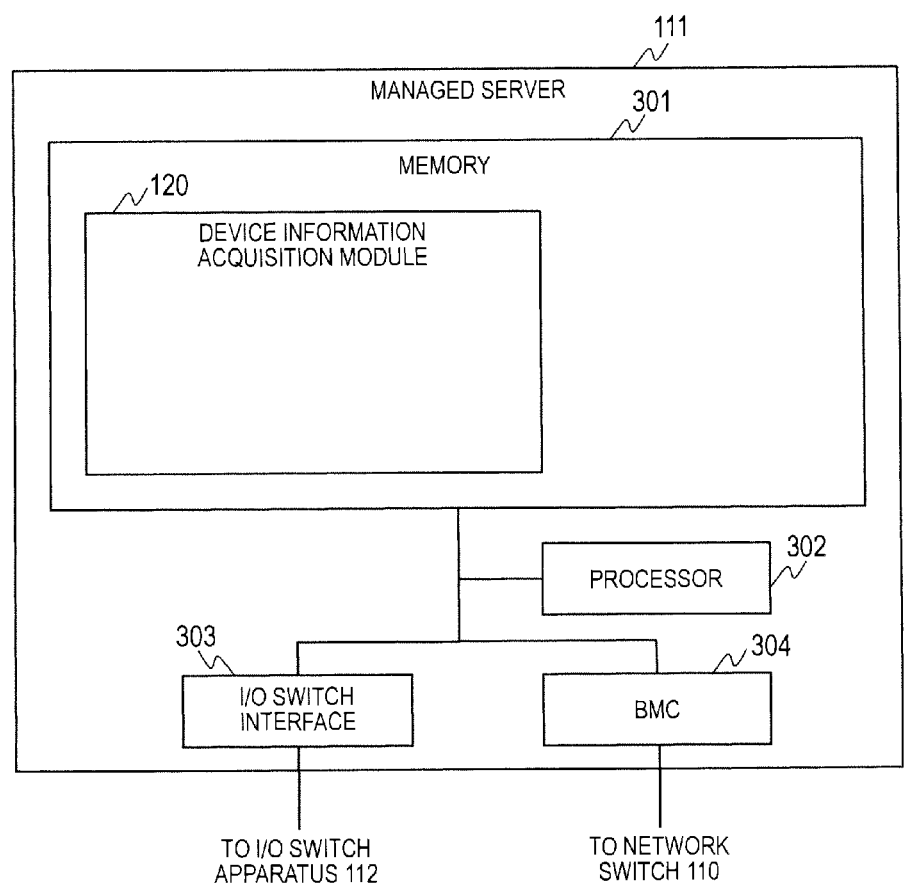
FIG. 3 is a diagram illustrating a configuration example of a managed server in the first embodiment of this invention.

FIG. 3 is a diagram illustrating a configuration example of a managed server 111 in the first embodiment of this invention. The managed server 111 includes a memory 301, a processor 302, an I/O switch interface 303, and a BMC (Baseboard Management Controller) 304.

The memory 301 is a storage device, such as a RAM, for retrieving and storing a program held in a disk drive (not-shown) at startup of the managed server 111. This program is a program for performing the function of the device information acquisition module 120. This memory 301 also stores files and data required to execute the program.

The processor 302 is a CPU for executing the program stored in the memory 301. The I/O switch interface 303 is an interface device for connecting to the I/O switch apparatus 112. The BMC 304 is an interface device for connecting to the network switch 110.

The device information acquisition module 120 acquires information representing the logical configuration of the I/O devices 115 recognized by the OS of the managed server 111.

FIG. 4 is a diagram illustrating an example of the server management table 106 in the first embodiment of this invention. The server management table 106 stores information acquired by the device information acquisition module 120 of each managed server 111, particularly, information representing the connection state between each managed server 111 and the I/O switch apparatus 112.

The server apparatus identifier 401 stores identifiers for uniquely identifying managed servers 111. The processor configuration 402 stores information on the processor configuration of each managed server 111. The memory capacity 403 stores information on the memory capacity of each managed server 111.

The connected I/O switch identifier 404 stores identifiers for uniquely identifying I/O switch apparatuses 112 connected from each managed server 111. The assigned I/O switch port number 405 stores the port numbers of the upstream ports 113 of the I/O switch apparatus 112 that are assigned to each managed server 111.

The example shown in FIG. 4 indicates that the managed server 111 of "HOST0" is assigned port numbers 0, 1, 4, and 5 of the I/O switch apparatus 112 of "SW1" and the managed server 111 of "HOST1" is assigned port numbers 2, 3, 6, and 7 of the I/O switch apparatus 112 of "SW 1" (also refer to FIG. 1).

As described above, the server management table 106 stores information (404) for identifying the I/O switch apparatus 112 connected from each managed server 111 and information (405) indicating port numbers of the ports 113 of the I/O switch apparatus 112 assigned to each managed server 111. The information to be stored is acquired by each managed server 111 and sent to the management server 101; however, the way to acquire the information is not limited to this. The management server 101 may have the initiative to acquire the information from each managed server 111.

Figure 5:
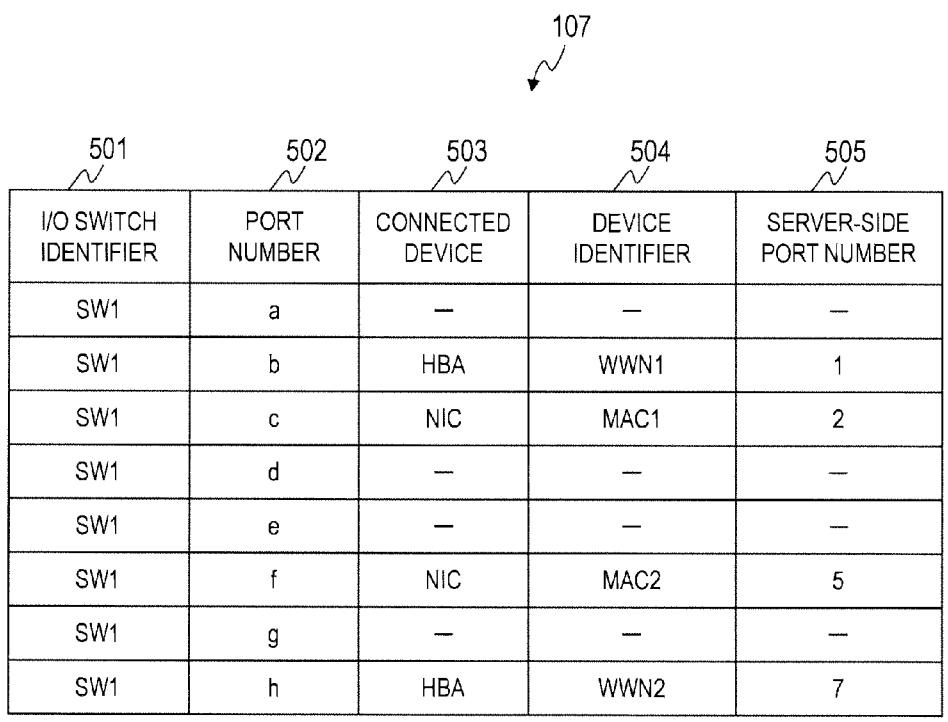
FIG. 5 is a diagram illustrating an example of the I/O configuration information table in the first embodiment of this invention.

FIG. 5 is a diagram illustrating an example of the I/O configuration information table 107 in the first embodiment of this invention. The I/O configuration information table 107 stores information acquired by the management program running on the I/O switch apparatus 112, which is information representing the physical configuration of the I/O devices 115 connected to the I/O switch apparatus 112.

The I/O switch identifier 501 stores identifiers for uniquely identifying I/O switch apparatuses 112. The port number 502 stores port numbers of the downstream ports 114 included in each I/O switch apparatus 112.

The connected device 503 stores information on the type of the I/O device 115 connected to each port listed in the port number 502. The information may be HBA (Host Bus Adapter) or NIC (Network Interface Card). The device identifier 504 stores the identifier for uniquely identifying the I/O device 115 connected to each port listed in the port number 502. The server-side port number 505 stores the port number of the upstream port 113 connected from each port listed in the port number 502.

The example shown in FIG. 5 indicates that, for example, an HBA having an identifier "WWN1" is connected to the port numbered "b" and the port numbered "b" is connected to an upstream port numbered "1" in the I/O switch apparatus 112 of "SW1" (also refer to FIG. 1).

As described above, the I/O configuration information table 107 stores information representing the physical configuration of I/O devices 115. When the configuration of the I/O devices 115 connected to an I/O switch 112 is changed, the I/O switch apparatus 112 acquires information on the physical configuration of the changed I/O device 115 and notifies the management server 101 of it with the management program running on the apparatus. The management server 101 updates the I/O configuration information table 107 with the received information.

The information to be stored is acquired by each I/O switch apparatus 112 and sent to the management server 101; however, the way to acquire the information is not limited to this. The management server 101 may have the initiative to acquire the information from each I/O switch apparatus 112.

Figure 6:
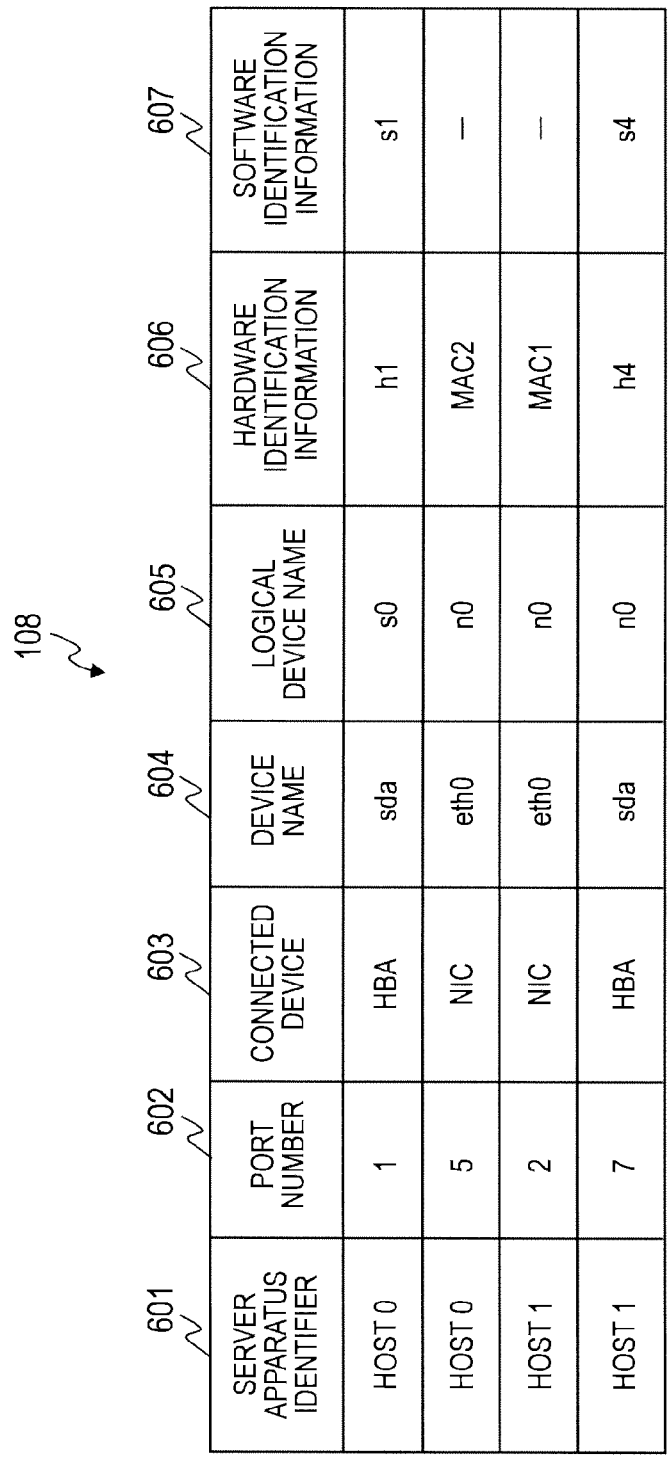
FIG. 6 is a diagram illustrating an example of the device information management table in the first embodiment of this invention.

FIG. 6 is a diagram illustrating an example of the device information management table 108 in the first embodiment of this invention. The device information management table 108 stores information acquired by the device information acquisition module 120 in each managed server 111, which is information representing the logical configuration of the I/O devices 115 recognized by the OS of each managed server 111.

The server apparatus identifier 601 stores identifiers for uniquely identifying managed servers 111. The port number 602 stores port numbers of the upstream ports whose associated downstream ports are connected to I/O devices 115 out of the port numbers of the upstream ports of the I/O switch apparatus 112 which are assigned to managed servers 111 (refer to the assigned I/O switch port number 405 in FIG. 4).

The connected device 603 stores information indicating the type of the I/O device 115 connected to the downstream port associated with each upstream port listed in the port number 602. The device name 604 stores the physical device name of each I/O device 115 listed in the connected device 603. The logical device name 605 stores the logical device name assigned to each I/O device 115 listed in the connected device 603.

The hardware identification information 606 and the software identification information 607 respectively store unique identification information with which the OS of each managed server 111 recognizes the hardware and the software of a device (the storage apparatus 116, for example) connected to each I/O device 115 listed in the connected device 603.

The example shown in FIG. 6 indicates that, for example, the managed server 111 of "HOST0" recognizes the HBA connected to the port numbered "1" with a physical device name of "sda" and a logical device name of "s0" and further, with respect to the storage apparatus 116 connected to this HBA, the hardware identification information is "h1" and the software identification information is "s1" (also refer to FIG. 1).

As described above, the device information management table 108 stores information representing the logical configuration of I/O devices 115. Upon recognition of a configuration change in I/O devices 115, the device information acquisition module 120 in each managed server 111 acquires information representing the logical configuration of I/O devices 115 and sends it to the management server 101. The management server 101 updates the device information management table 108 based on the received information.

The information to be stored is acquired by each device information acquisition module 120 and sent to the management server 101; however, the way to acquire the information is not limited to this. The management server 101 may have the initiative to acquire the information from each managed server 111.

Figure 7:
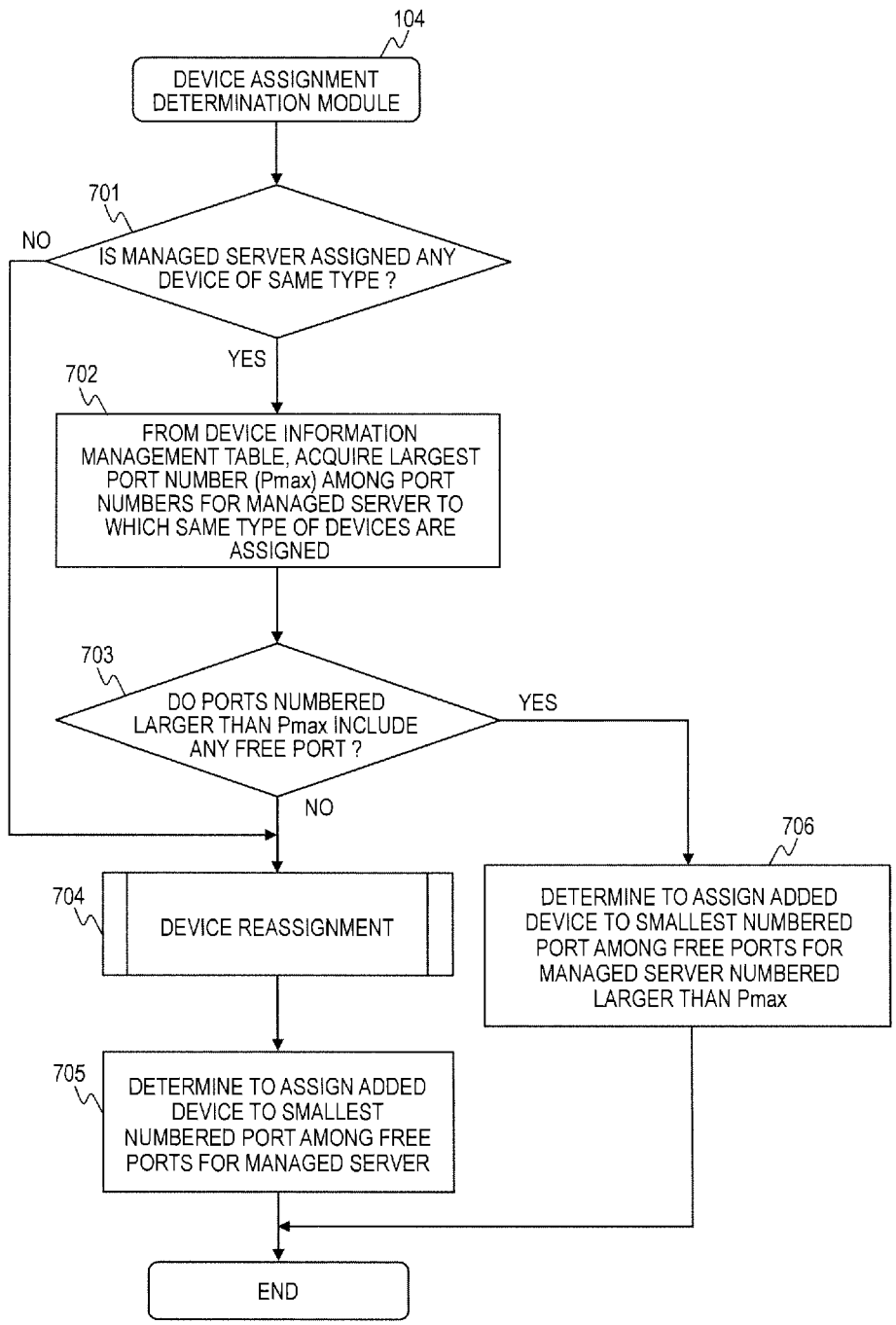
FIG. 7 is a flowchart illustrating control logic of the device assignment determination module in the first embodiment of this invention.

FIG. 7 is a flowchart illustrating control logic of the device assignment determination module 104 in the first embodiment of this invention. The device assignment determination module 104 is invoked by the device information management module 103 to perform the operations described as follows.

Figure 9:
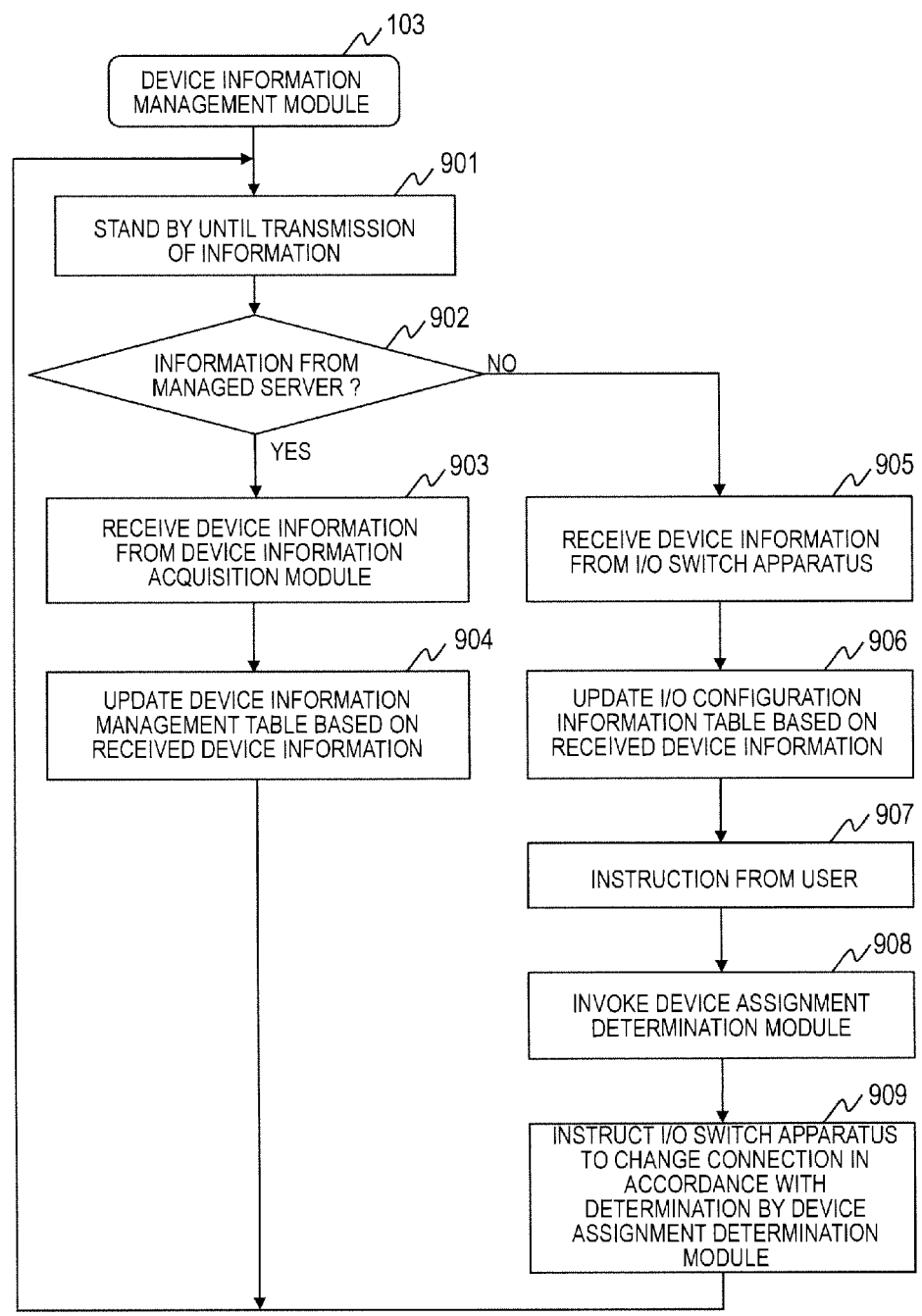
FIG. 9 is a flowchart illustrating control logic of the device information management module in the first embodiment of this invention.

First, at Step 701, the device assignment determination module 104 determines whether the particular managed server 111 is assigned any I/O device 115 of the same type (701). At this step, the device assignment determination module 104 refers to the device information management table 108 (FIG. 6) to determine whether the managed server 111 designated by the user at Step 907 in FIG. 9 is assigned any I/O device 115 of the same type as the added I/O device 115.

Specific explanation is provided with FIG. 6. If the designated managed server 111 is HOST0 and the added I/O device 115 is an HBA (Condition 1), the device information management table 108 indicates that the port 1 for HOST0 is connected to an HBA of the same type. Accordingly, the determination at Step 701 is that the managed server 111 is assigned an I/O device 115 of the same type. In similar, if the designated managed server 111 is HOST0 and the added I/O device 115 is an NIC (Condition 2), the device information management table 108 indicates that the port 5 for HOST0 is connected to an NIC of the same type. Accordingly, the determination at Step 701 is that the managed server 111 is assigned an I/O device 115 of the same type.

If the managed server 111 is assigned an I/O device 115 of the same type (YES at 701), the device assignment determination module 104 proceeds to Step 702 to acquire the largest value (hereinafter, referred to as Pmax) among the port numbers to which the same type of I/O devices 115 are assigned, from the port number 602 of the device information management table 108. This operation corresponds to searching for the port number for the I/O device 115 to be recognized at the latest time by the OS of the managed server 111. In the case of the foregoing Condition 1, Pmax is 1. In the case of Condition 2, Pmax is 5. The device assignment determination module 104 then proceeds to Step 703. If the managed server 111 is not assigned any I/O device 115 of the same type (NO at 701), the device assignment determination module 104 proceeds to Step 705.

At Step 703, the device assignment determination module 104 determines whether the ports numbered larger than Pmax include any free port (703). At this step, the device assignment determination module 104 refers to the server management table 106 and the device information management table 108 to determine whether the ports numbered larger than Pmax include any free port. This operation is to assign the added I/O device 115 to the free port numbered larger than Pmax, if any. In the case of the foregoing Condition 1, the port 4, which is numbered larger than Pmax (=1), is free (YES at 703). In the case of Condition 2, however, there is no port numbered larger than Pmax (=5) (NO at 703).

If such free ports exist (YES at 703), the device assignment determination module 104 proceeds to Step 706 and determines to assign the added device 115 to the smallest numbered port among the free ports for the managed server 111 numbered larger than Pmax (706). In the case of the foregoing Condition 1, the device assignment determination module 104 determines to assign the added device 115 to the port 4, which is numbered smallest among the free ports for the managed server 111.

Through this Step 706, the OS of the managed server 111 can recognize the added I/O device 115 at the latest time among the same type of I/O devices 115 without changing the logical configuration of the existing I/O devices 115.

If no free port exists (NO at 703), the device assignment determination module 104 proceeds to Step 704 and performs device reassignment (704). Processing at Step 704 is described later in detail. This Step 704 applies to the case of the foregoing Condition 2. Then, the device assignment determination module 104 proceeds to Step 705.

At Step 705, the device assignment determination module 104 determines to assign the added device 115 to the smallest numbered port among the free ports for the managed server 111 (705).

Through this Step 705, the OS of the managed server 111 can recognize the added I/O device 115 without changing the logical configuration of the existing I/O devices 115.

Through the processing described above, the device assignment determination module 104 determines the server-side ports 113 to be assigned to the I/O devices 115. Then, the I/O switch apparatus 112 connects the managed server 111 and the I/O devices 115 in accordance with the determination by the device assignment determination module 104.

When the managed server 111 starts up thereafter, the device information acquisition module 120 acquires information representing the logical configuration of the I/O devices 115 after the configuration change and sends the acquired information to the management server 101. The management server 101 updates the device information management table 108 based on the received information. Consequently, the device information management table 108 can be consistent with the actual logical configuration of I/O devices 115.

Figure 8:
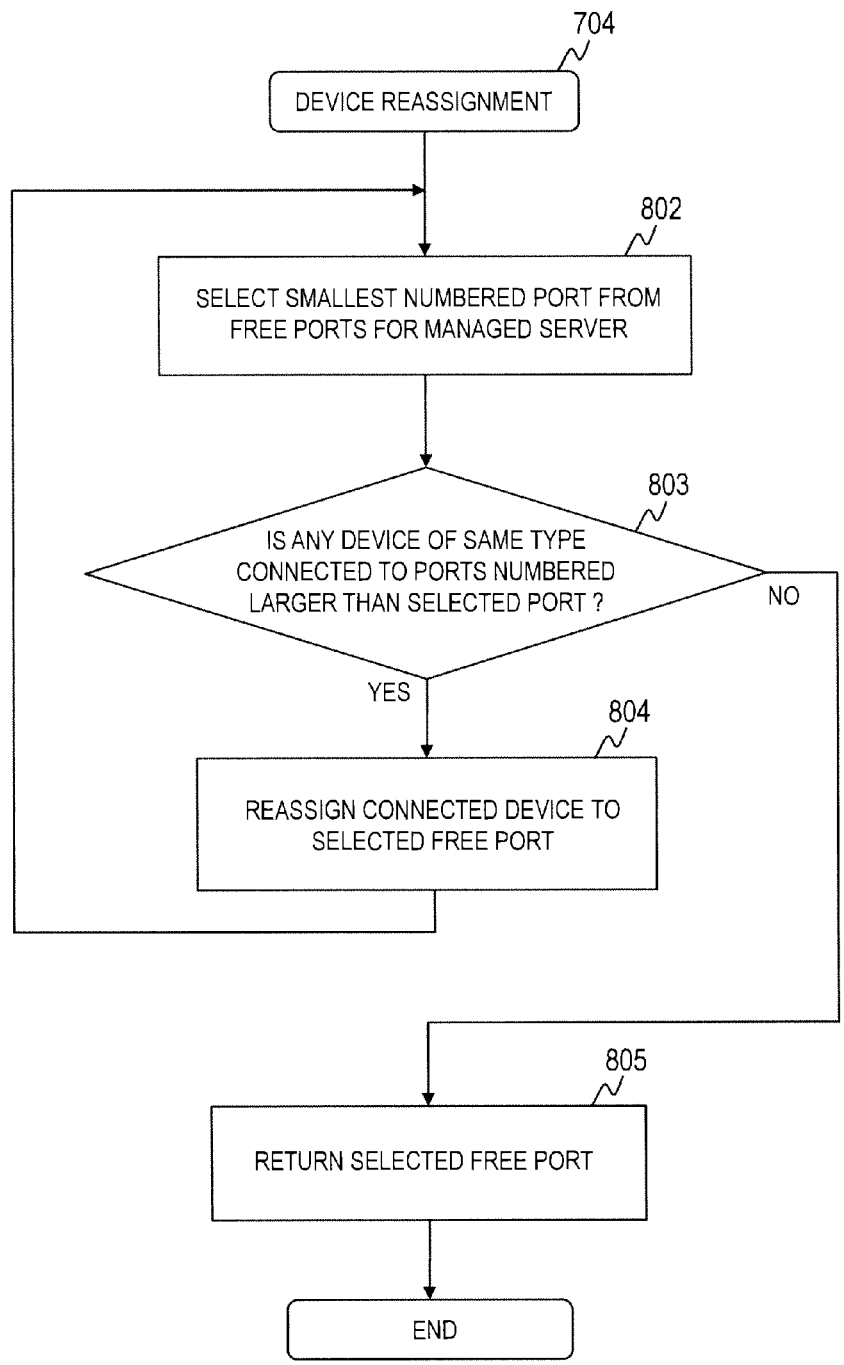
FIG. 8 is a flowchart illustrating control logic for device reassignment in the first embodiment of this invention.

FIG. 8 is a flowchart illustrating control logic for device reassignment in the first embodiment of this invention. This section describes the operation at Step 704 in FIG. 7.

First, at Step 802, the device assignment determination module 104 selects the smallest numbered port from the free ports for the managed server 111 (802). For example, in the case of the foregoing Condition 2 (in the case where the designated managed server 111 is HOST0 and the added I/O device 115 is an NIC), the device assignment determination module 104 selects the smallest numbered port 0 from the free ports for the designated managed server 111.

Next, at Step 803, the device assignment determination module 104 determines whether any I/O device 115 of the same type is connected to the ports numbered larger than the port selected at Step 802 (803). In the case of the foregoing Condition 2, an NIC of the same type is connected to the port 5; accordingly, the device assignment determination module 104 determines that an I/O device 115 of the same type is connected (YES at 803).

If some device of the same type is connected (YES at 803), the device assignment determination module 104 proceeds to Step 804, reassigns the connected I/O device 115 to the free port selected at Step 802 (804), and returns to Step 802 to repeat the processing. The repeating Steps 802 to 804 corresponds to reassigning the existing I/O devices 115 of the same type to the ports each moved up (toward the smallest numbered port) by one.

If no device of the same type is connected (NO at 803), the device assignment determination module 104 proceeds to Step 805 to return the selected free port (805).

Through the processing described above, the device assignment determination module 104 reassigns the existing I/O devices 115 of the same type to the ports each moved up by one. That is to say, if the added I/O device 115 is an NIC, the device assignment determination module 104 moves up the ports assigned the existing NICs and determines the last free port to be assigned the added I/O device 115.

Consequently, the OS of the managed server 111 can recognize the added I/O device 115 at the latest time among the same type of I/O devices 115 including the added I/O device 115.

FIG. 9 is a flowchart illustrating control logic of the device information management module 103 in the first embodiment of this invention. The device information management module 103 performs the operations described as follows to manage the information stored in the server management table 106, the I/O configuration information table 107, and the device information management table 108.

First, at Step 901, the device information management module 103 stands by until transmission of information (901). In this example, the device information management module 103 stands by until one of the managed servers 111 or the I/O switch apparatus 112 transmits information.

At Step 902, upon receipt of the information, the device information management module 103 determines whether the received information is from a managed server 111 or the I/O switch apparatus 112 (902).

If the information is from a managed server 111 (YES at 902), the device information management module 103 proceeds to Step 903 to receive information representing the logical configuration of I/O devices 115 (information representing the logical configuration of the I/O devices 115 after the configuration change) acquired by the device information acquisition module 120 of the managed server 111 (903). Then, the device information management module 103 updates the device information management table 108 based on the received information representing the logical configuration of I/O devices 115 (904). Then, the device information management module 103 returns to Step 901 to repeat the processing.

If the information is from the I/O switch apparatus 112 (NO at 902), the device information management module 103 proceeds to Step 905 to receive information representing the physical configuration of I/O devices 115 (information representing the physical configuration of the added I/O 115) acquired by the management program in the I/O switch apparatus 112 (905). Then, the device information management module 103 updates the I/O configuration information table 107 based on the received information representing the physical configuration of I/O devices 115 (906).

Then, at Step 907, the device information management module 103 receives an instruction from the user (907). This instruction from the user is an instruction received from the user through the user interface module 105 in the management server 101 and designating the managed server 111 to be assigned the added I/O device 115.

Next, the device information management module 103 invokes the device assignment determination module 104 (908). The detailed operations of the invoked device assignment determination module 104 are illustrated in FIG. 7. The invoked device assignment determination module 104 determines the ports to be assigned the I/O devices 115 from the server-side ports 113.

Then, the device information management module 103 issues an instruction to the I/O switch apparatus 112 to change the connection between the managed server 111 and each I/O device 115 in accordance with the determination by the device assignment determination module 104 (909). The I/O switch apparatus 112 changes the connection between the managed server 111 and each I/O device 115 based on the instruction. Then, the device information management module 103 returns to Step 901 to repeat the processing.

Through the processing described above, the device information management module 103 manages the information stored in the server management table 106, the I/O configuration information table 107, and the device information management table 108. This management assures the consistency in device names of the I/O devices 115 when assigning the device names of the I/O devices 115 to the ports 114 sequentially from the smallest numbered port at OS startup of a managed server 111, even if the device configuration is different from the one at the previous OS startup.

Figure 10:
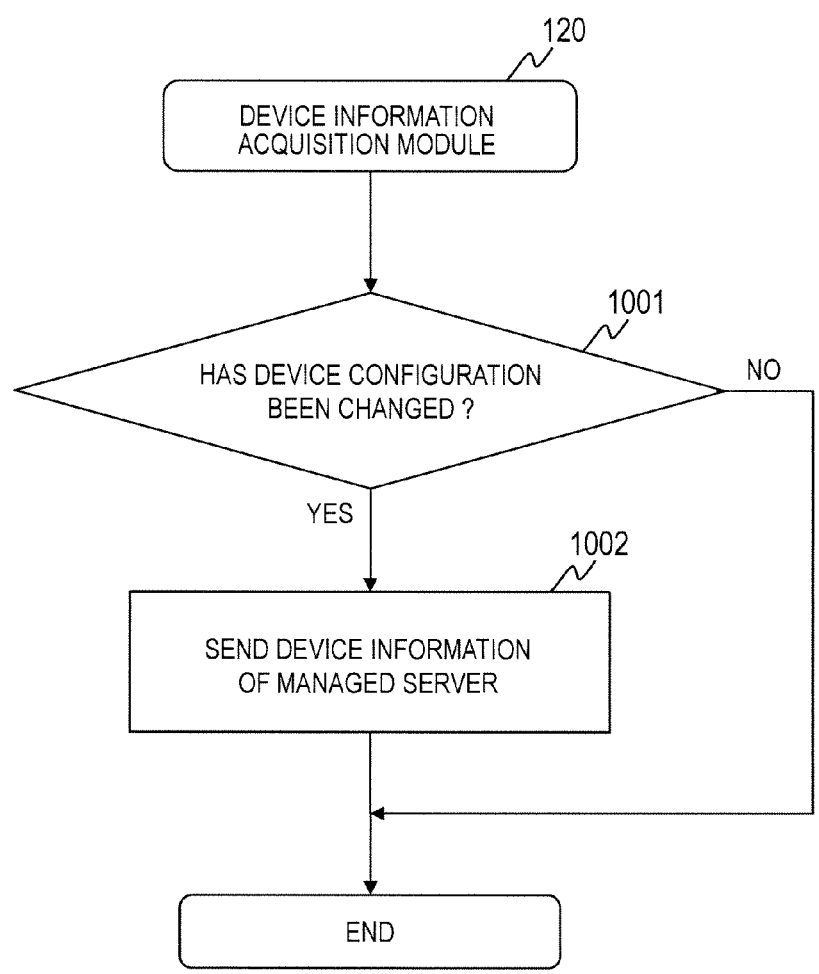
FIG. 10 is a flowchart illustrating control logic of the device information acquisition module in the first embodiment of this invention.

FIG. 10 is a flowchart illustrating control logic of the device information acquisition module 120 in the first embodiment of this invention. The device information acquisition module 120 performs the operations described as follows at startup of the managed server 111 including this device information acquisition module 120.

First, at Step 1001, the device information acquisition module 120 determines whether the device configuration has been changed (1001). The change in the device configuration is detected when the logical configuration of the I/O devices 115 recognized by the OS of the managed server 111 is different from the logical configuration of the I/O devices 115 recognized by the OS of the managed server 111 at the previous startup.

If the device configuration has been changed (YES at 1001), the device information acquisition module 120 proceeds to Step 1002, acquires information representing the logical configuration of I/O devices 115, and sends it to the management server 101 (1002). If the device configuration has not been changed (NO at 1001), the device information acquisition module 120 terminates the processing.

Through the processing described above, the device information acquisition module 120 investigates the logical configuration of I/O devices 115 at every startup of the managed server 111 and if the logical configuration of I/O devices 115 is different from the one at the previous startup (for example, because of addition of an I/O device 115), the device information acquisition module 120 sends information representing the logical configuration of the I/O devices 115 after the configuration change to the management server 101.

The foregoing description has explained a case where the device information acquisition module 120 starts operation at startup of the managed server 111 by way of example; however, the time to start operation is not limited to this case. For example, it may be when the OS recognizes a configuration change in I/O devices 115 with the hot plug function.

As understood from the description of the first embodiment of this invention, the management server 101 cooperates with the I/O switch apparatus 112 to assure the consistency in device names of the devices even if the device configuration has been changed because of, for example, addition of an I/O device 115.

Second Embodiment

The foregoing first embodiment described an example where the device configuration is changed because of addition of a new I/O device 115. The second embodiment describes a case where the device configuration is changed because of installment (addition), removal, or replacement of an I/O device 115. Hereinafter, differences from the foregoing first embodiment are mainly described and repetitive explanation is omitted as appropriate.

Figure 11:
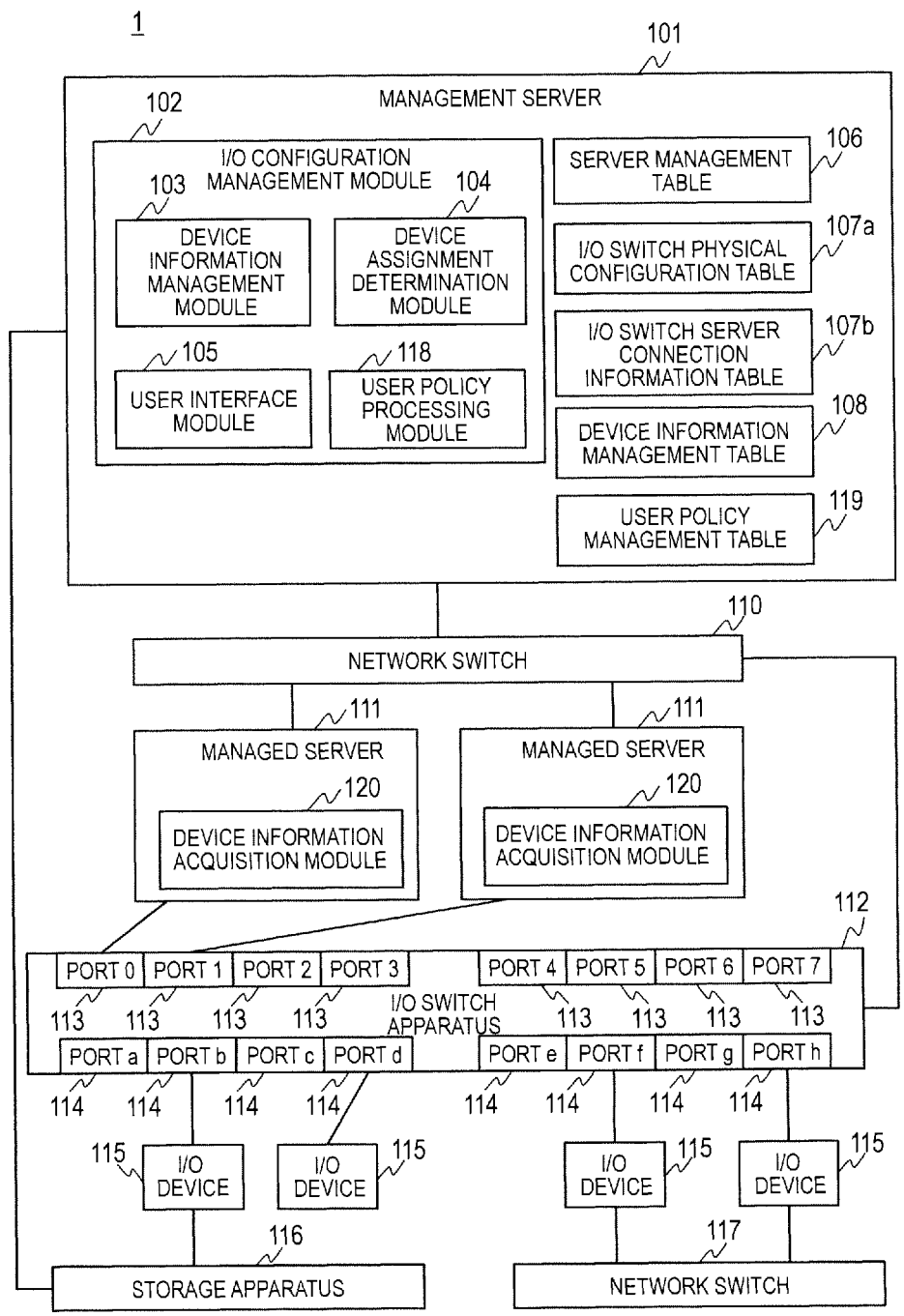
FIG. 11 is a diagram illustrating an overall configuration example of the computer system in the second embodiment of this invention.

FIG. 11 is a diagram illustrating an overall configuration example of the computer system 1 in the second embodiment of this invention.

In the management server 101 shown in FIG. 11, the I/O configuration management module 102 further includes a user policy processing module 118. The management server 101 also includes an I/O switch physical configuration table 107a, an I/O switch server connection information table 107b, and a user policy management table 119. The I/O switch physical configuration table 107a and the I/O switch server connection information table 107b correspond to the foregoing I/O configuration information table 107 (refer to FIG. 1). Each element is described later.

The management server 101 receives a notice of change in the logical configuration or the physical configuration of I/O devices 115 from a managed server 111 or the I/O switch apparatus 112, and controls the I/O switch apparatus 112 based on the received notice of change.

For example, upon receipt of a notice of change in the physical configuration indicating that an I/O device 115 has been added, removed, or replaced, the management server 101 investigates the logical configuration of I/O devices 115 and informs the I/O switch apparatus 112 of a physical configuration matching the logical configuration of the I/O devices 115. The physical configuration matching the logical configuration of the I/O devices 115 is a physical configuration with which the logical configuration of the existing I/O devices 115 will not change even if an I/O device 115 is added, removed, or replaced. Such a configuration eliminates the user from manually modifying the logical configuration before or after the configuration change in I/O devices 115. Specific details of the control are described later.

As to the managed server 111 shown in FIG. 11, the device information acquisition module 120 acquires information, such as unique information and software information, representing the logical configuration of I/O devices 115.

The I/O switch apparatus 112 shown in FIG. 11 notifies, upon change of the configuration of I/O devices 115 because of addition, removal, or replacement of an I/O device 115, the management server 101 of information representing the physical configuration of the changed I/O device 115, hardware information, and update (change) time with a management program running on the apparatus.

The network switch 117 is a communication apparatus having a function for switching communication channels and packets among the I/O devices 115 and other computers (not shown).

Figure 12:
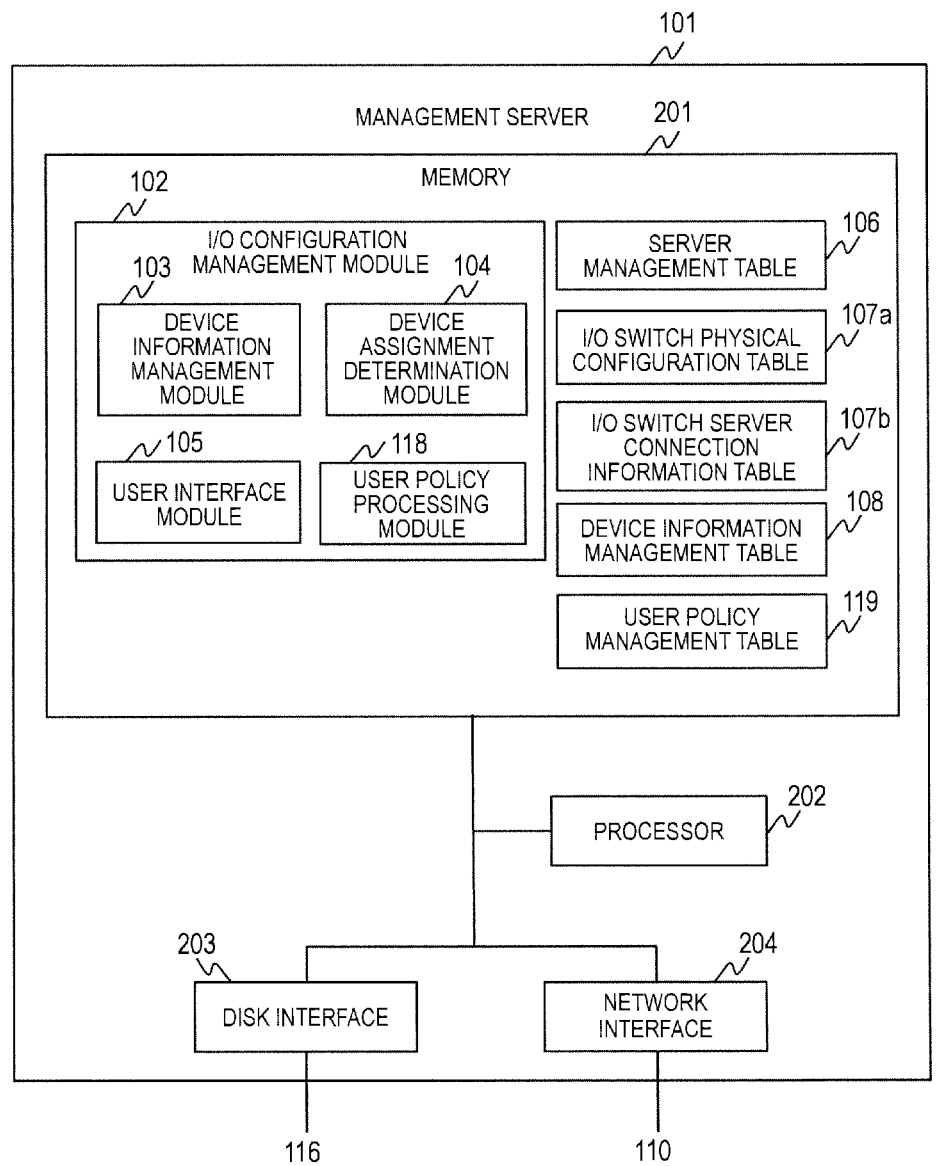
FIG. 12 is a diagram illustrating a configuration example of the management server in the second embodiment of this invention.

FIG. 12 is a diagram illustrating a configuration example of the management server 101 in the second embodiment of this invention.

The memory 201 in the second embodiment of this invention stores the I/O configuration management module 102, the server management table 106, the I/O switch physical configuration table 107a, the I/O switch server connection information table 107b, the device information management table 108, and the user policy management table 119.

The I/O configuration management module 102 includes a device information management module 103, a device assignment determination module 104, a user interface module 105, and a user policy processing module 118 to manage the logical configuration and the physical configuration of I/O devices 115.

The device information management module 103 manages information on I/O devices 115 (information representing the logical configuration and the physical configuration). The device assignment determination module 104 determines the order of recognition in the PCI configuration tree depending on the change in the configuration of I/O devices 115 when it occurs. Details of these device information management module 103 and device assignment determination module 104 are described later with reference to FIGS. 24 and 18.

The user interface module 105 receives input of an instruction by the user. This instruction here may be an instruction designating the managed server 111 for which the I/O configuration (the configuration of I/O devices to be managed) is changed.

The user policy processing module 118 determines, in a case where a new I/O device 115 is connected to the I/O switch apparatus 112, whether the connection of the new I/O device 115 is for replacement or not (for new connection) in accordance with the user policy defined in the user policy management table 119.

The server management table 106 is a table for managing the configuration of managed servers 111. The I/O switch physical configuration table 107a is a table for storing information representing the physical configuration of the I/O devices 115 connected to the I/O switch apparatus 112. The I/O switch server connection information table 107b is a table for storing information on connection between the I/O switch apparatus 112 and each I/O device 115. The device information management table 108 is a table for storing information representing the logical configuration of I/O devices 115. The user policy management table 119 is a table for managing policies predefined by the user. These tables are described later with reference to FIGS. 13 to 17B.

Figure 13:
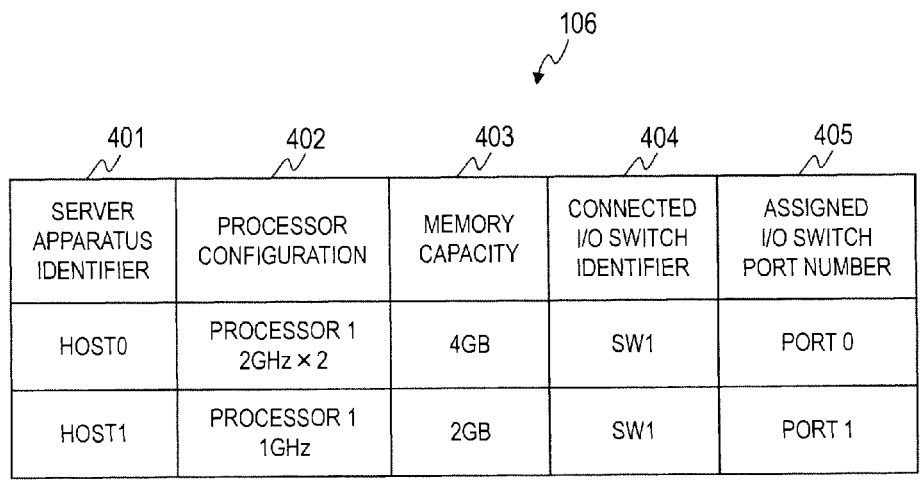
FIG. 13 is a diagram illustrating an example of the server management table in the second embodiment of this invention.

FIG. 13 is a diagram illustrating an example of the server management table 106 in the second embodiment of this invention. The server management table 106 stores information acquired by the device information acquisition module 120 of each managed server 111, particularly, information representing the connection state between each managed server 111 and the I/O switch apparatus 112. In the following description, the same elements as those in FIG. 4 are denoted by the same reference signs and repetitive explanation is omitted as appropriate.

The example shown in FIG. 13 indicates that the managed server 111 of "HOST0" is assigned the port number 0 of the I/O switch apparatus 112 of "SW1" and the managed server 111 of "HOST1" is assigned the port number 1 of the I/O switch apparatus 112 of "SW1" (also refer to FIG. 11).

As described above, the server management table 106 stores information (404) for identifying the I/O switch apparatus 112 connected from each managed server 111 and information (405) indicating port numbers of the ports 113 of the I/O switch apparatus 112 assigned to each managed server 111. The information to be stored is acquired by each managed server 111 and sent to the management server 101; however, the way to acquire the information is not limited to this. The management server 101 may have the initiative to acquire the information from each managed server 111.

Figure 14:
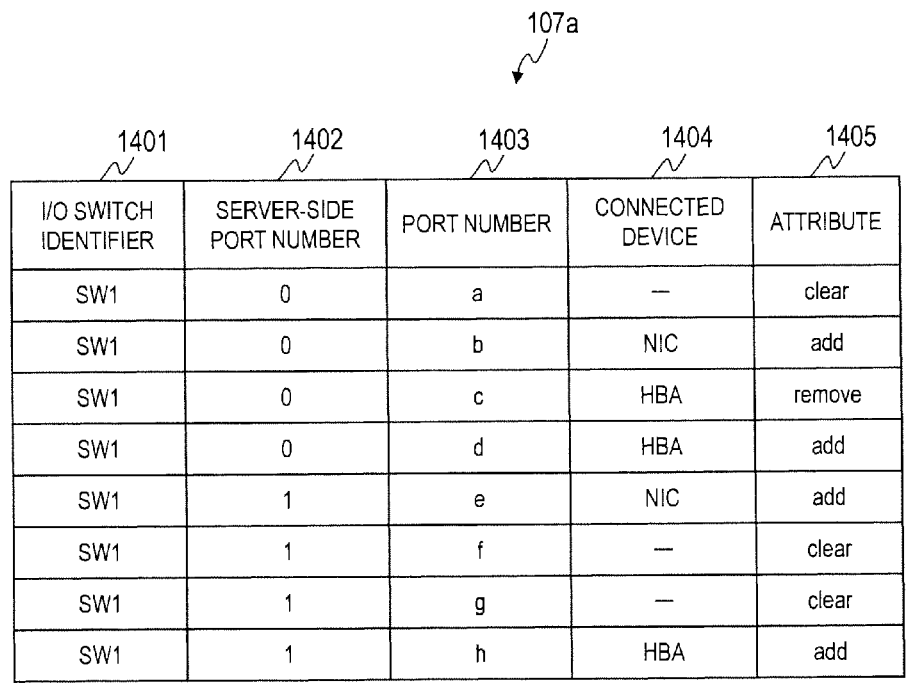
FIG. 14 is a diagram illustrating an example of the I/O switch physical configuration table in the second embodiment of this invention.

FIG. 14 is a diagram illustrating an example of the I/O switch physical configuration table 107*a* in the second embodiment of this invention. The I/O switch physical configuration table 107*a* stores information acquired by the management program running on the I/O switch apparatus 112, which is information representing the physical configuration of the I/O devices 115 connected to the I/O switch apparatus 112.

The I/O switch identifier 1401 stores identifiers for uniquely identifying I/O switch apparatuses 112. The server-side port number 1402 stores port numbers of the upstream ports 113 connected from the ports listed in the port number 1403, among the upstream ports 113 included in each I/O switch apparatus 112.

The port number 1403 stores port numbers of the downstream ports 114 included in each I/O switch apparatus 112. The connected device 1404 stores information on the type of the I/O device 115, such as HBA or NIC, which is connected to each port listed in the port number 1403.

The attribute 1405 stores the attribute of each port listed in the port number 1403. The attribute here is the connection state of the I/O device 115 to the port. The attribute "add" means that the I/O device 115 is connected to the port. The attribute "remove" means that the I/O device 115 in the connected device 1404 was connected before but is now removed. The attribute "clear" means that no I/O device 115 has been connected to the port since the startup of the I/O switch apparatus 112.

The example shown in FIG. 14 indicates that, in the I/O switch apparatus 112 of "SW1" connected to a managed server 111 at the port numbered "0", no I/O device 115 has been connected to the port numbered "a" since the startup of the I/O switch apparatus 112. It also indicates that an NIC is connected to the port numbered "b", and further, an HBA was connected to the port numbered "c" but is now removed therefrom. (also refer to FIG. 11).

As described above, the I/O switch physical configuration table 107*a* stores information representing the physical configuration of the I/O devices 115 connected to each I/O switch apparatus 112. When the configuration of the I/O devices connected to an I/O switch 112 is changed, the I/O switch apparatus 112 acquires information on the physical configuration of the changed I/O device 115 and notifies the management server 101 of it with the management program running on the apparatus. The management server 101 updates the I/O switch physical configuration table 107*a* based on the received information.

The information to be stored is acquired by each I/O switch apparatus 112 and sent to the management server 101; however, the way to acquire the information is not limited to this. The management server 101 may have the initiative to acquire the information from each I/O switch apparatus 112.

FIG. 15 is a diagram illustrating an example of the I/O switch server connection information table 107*b* in the second embodiment of this invention. The I/O switch server connection information table 107*b* stores information acquired by the management program running on the I/O switch apparatus 112, which is information on connection between the I/O switch apparatus 112 and each I/O device 115.

The I/O switch identifier 1501 stores identifiers for uniquely identifying I/O switch apparatuses 112. The server-side port number 1502 stores port numbers of the upstream ports 113 connected from the ports listed in the port number 1504, among the upstream ports 113 included in the I/O switch apparatus 112.

The PCI configuration tree-based recognition order 1503 stores numbers indicating the order for the I/O switch apparatus 112 to recognize the I/O devices 115 based on the PCI configuration tree. The example shown in FIG. 15 indicates that the I/O switch apparatus 112 first recognizes the I/O device 115 connected to the port numbered "0" in the PCI configuration tree-based recognition order 1503 and thereafter, recognizes the I/O devices 115 connected to the ports numbered "1" to "7" in the PCI configuration tree-based recognition order 1503, sequentially in this order. The PCI configuration tree is a topology configured with the I/O switch apparatus 112 and I/O devices 115. This topology defines the order of recognizing the I/O devices 115.

The port number 1504 stores port numbers of the downstream ports 114 to which I/O devices 115 are connected among the downstream ports 114 included in the I/O switch apparatus 112.

The device state 1505 stores information indicating the state (either "physical device" or "virtual device") of the I/O device 115 connected to each port listed in the port number 1504. The device state 1505 indicating "physical device" means that the actual I/O device 115 is physically connected. The device state 1505 indicating "virtual device" means that the I/O device 115 was connected before but is now removed. The "virtual device" is described later in detail.

The attribute 1506 stores information indicating the attribute (either "normal" or "closed") of the I/O device 115 connected to each port listed in the port number 1504. The attribute 1506 indicating "normal" means that the I/O device 115 is in a normal (accessible) state. The attribute 1506 indicating "closed" means that the I/O device 115 is in a closed (inaccessible) state. The "closed" is described later in detail.

Now, the "virtual device" is described in detail. As mentioned above, an I/O device 115 of which the device state 1505 is "virtual device" is an I/O device 115 that was connected before but is now removed. If such an I/O device 115 is in the middle of the order of recognizing the same type of I/O devices 115, the OS of the managed server 111 recognizes that the removed I/O device 115 does not exist. For this reason, the I/O devices 115 recognized subsequently to the removed I/O device 115 are recognized in the order different from the one when the removed I/O device 115 existed. As a result, their device name becomes inconsistent. Hence, in the second embodiment of this invention, the removed I/O device 115 is recognized as a virtual device to prevent inconsistency in device names.

Specifically, the management server 101 uses a function of MR-IOV (Multi Root I/O Virtualization) or SR-IOV (Single Root I/O Virtualization) to instruct the I/O switch apparatus 112 to replace the removed I/O device 115 with an unused VF (Virtual Function) in the PCI configuration tree. This approach prevents the order of recognition in the PCI configuration tree from being changed, and further, enables the managed server 111 to recognize the removed I/O device 115 as a virtual device.

If the I/O device 115 is an NIC, the management server 101 can replace the removed I/O device 115 with a VF for the NIC. If the I/O device 115 is an HBA, the management server 101 can replace the removed I/O device 115 with a dummy disk in cooperation with the storage apparatus 116. It should be noted that the I/O switch apparatus 112 may notify an agent program running on the OS of the managed server 111 of the information on the connection of the I/O devices 115 and the agent program that receives the notice may change the logical configuration of the I/O devices 115 after the configuration change, which is to be recognized by the OS, so as to be matched with the physical configuration of the I/O devices 115 after the configuration change. If the management server cannot assign a virtual device, it may notify the user of it.

When changing the device state 1505 into "virtual device", the management server 101 also changes the attribute 1506 into "closed" to prevent use of this virtual device. This operation prevents PCI packet communication by a virtual device.

In the example shown in FIG. 15, the I/O device 115 connected to the port numbered "c" is a "virtual device" as shown in the device state 1505 and is "closed" as shown in the attribute 1506. This indicates that this I/O device 115 was connected before but is now removed.

As described above, the I/O switch server connection information table 107b stores information on the connection between the I/O switch apparatus 112 and each I/O device 115 (including the device state 1505 and the attribute 1506). If the configuration of the I/O devices 115 connected to an I/O switch apparatus 112 is changed, the I/O switch apparatus 112 acquires information on the changed connection of the I/O switch apparatus 112 and the I/O device 115 with the management program running on the apparatus and notifies the management server 101 of it. The management server 101 updates the I/O switch server connection information table 107b with the received information.

The information to be stored is acquired by each I/O switch apparatus 112 and sent to the management server 101; however, the way to acquire the information is not limited to this. The management server 101 may have the initiative to acquire the information from each I/O switch apparatus 112.

Figure 16:
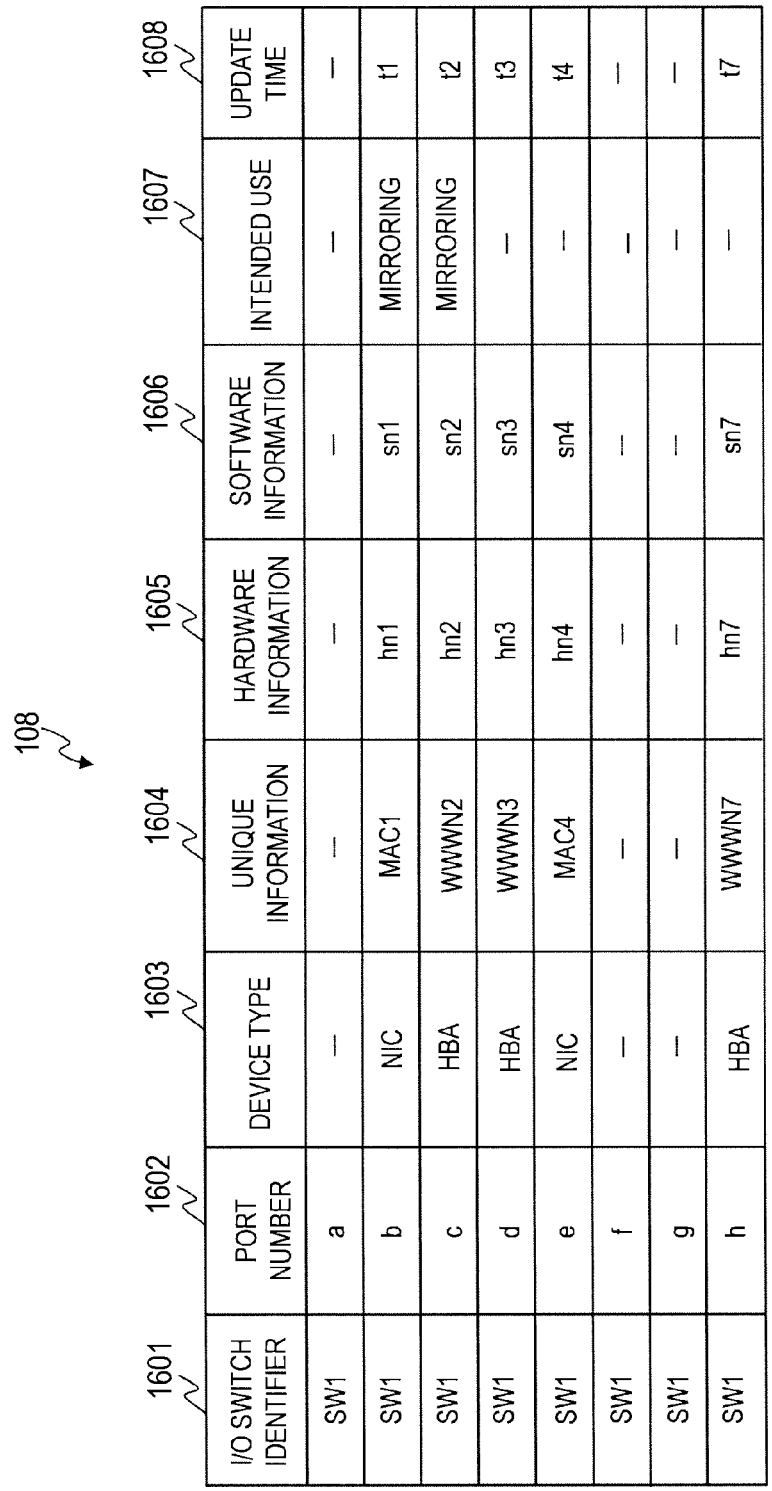
FIG. 16 is a diagram illustrating an example of the device information management table in the second embodiment of this invention.

FIG. 16 is a diagram illustrating an example of the device information management table 108 in the second embodiment of this invention. The device information management table 108 stores information acquired by the device information acquisition module 120 in each managed server 111 and information acquired by the equipment (for example, the storage apparatus 116) connected to each I/O device 115.

The I/O switch identifier 1601 stores identifiers for uniquely identifying I/O switch apparatuses 112. The port number 1602 stores port numbers of the downstream ports 114 included in the I/O switch apparatuses 112.

The device type 1603 and the unique information 1604 respectively store information indicating the type (such as HBA or NIC) and unique information (such as an identifier for uniquely identifying the I/O device 115) of the I/O device 115 connected to each port listed in the port number 1602.

The hardware information 1605 and the software information 1606 respectively store identification information with which the OS of each managed server 111 uniquely recognizes the hardware and the software of the device (the storage apparatus 116, for example) connected to the I/O device 115 which is connected to each port listed in the port number 1602.

If the I/O device 115 is an NIC, the hardware information 1605 may store a MAC address of the network switch 117 connected to the I/O device 115; if the I/O device 115 is an HBA, it may store a UUID (Universal Unique Identifier) of the storage apparatus 116 connected to the I/O device 115. If the I/O device 115 is an NIC, the software information 1606 may store a network address such as an IP address; if the I/O device 115 is an HBA, it may store file system information.

The intended use 1607 stores the intended use of the I/O device 115 connected to each port listed in the port number 1602. The update time 1608 stores the time when the connection state of the port is updated because of addition, removal, or the like of the I/O device 115 for each port listed in the port number 1602. The update time 1608 may store the time period passed since the previous update.

The example shown in FIG. 16 indicates that, in the I/O switch apparatus 112 of "SW1", the port numbered "d" taken as an example is connected to an HBA for "mirroring" and the connection state to this port is updated at time "t3".

As described above, the device information management table 108 stores information representing the logical configuration of I/O devices 115 acquired by the device information acquisition module 120 in each managed server 111, each I/O switch apparatus 112, and the equipment (for example, the storage apparatus 116) connected to each I/O device 115. Upon recognition of a configuration change in I/O devices 115, the device information acquisition module 120 in each managed server 111 and the I/O switch apparatus 112 acquire information representing the logical configuration of I/O devices 115 and send it to the management server 101. The management server 101 updates the device information management table 108 based on the received information.

The information to be stored is acquired by each device information acquisition module 120 and I/O switch apparatus 112 and sent to the management server 101; however, the way to acquire the information is not limited to this. The management server 101 may have the initiative to acquire the information from each managed server 111 and each I/O switch apparatus 112.

Figure 17A:
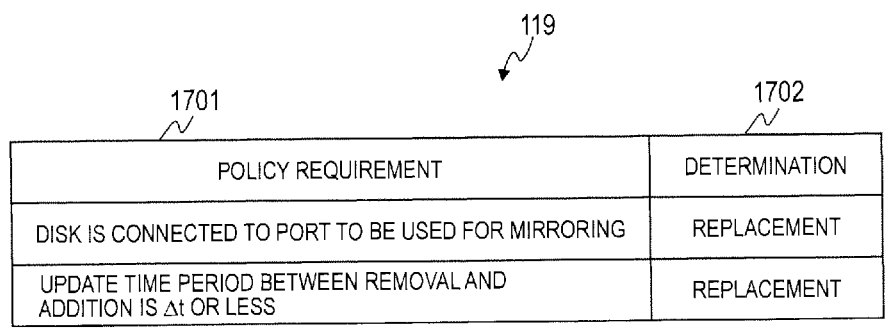
FIG. 17A is a diagram illustrating an example of the user policy management table in the second embodiment of this invention.
Figure 17B:
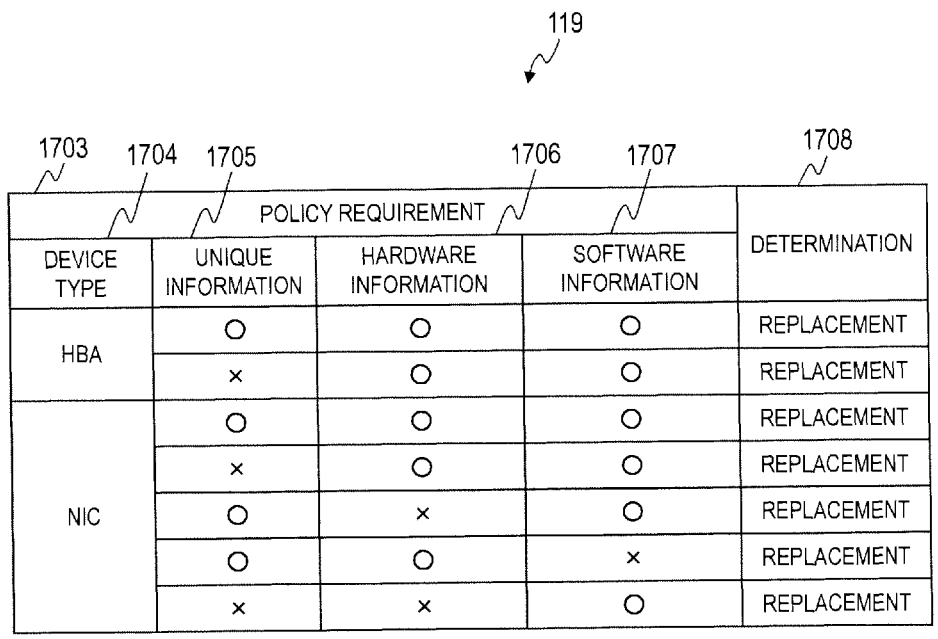
FIG. 17B is a diagram illustrating an example of the user policy management table in the second embodiment of this invention.

FIGS. 17A and 17B are drawings illustrating an example of the user policy management table 119 in the second embodiment of this invention.

The user policy management table 119 stores policies predefined by the user. The policies here are information to determine whether a new I/O device 115 connected to the I/O switch apparatus 112 is for replacement or not (namely, for new connection).

The user policy management table 119 shown in FIG. 17A associates the policy requirement 1701 with the determination 1702. The example shown in FIG. 17A defines that the management server 101 (the user policy processing module 118) determines the connection is for replacement if a new I/O device 115 is connected to a port of which the intended use 1607 (refer to FIG. 16) is mirroring or if the update time period between the time of removal of the previously connected I/O device 115 and the time of connection of the new I/O device 115, namely the difference in the update time 1608 (refer to FIG. 16), is a predetermined time period Δt or less.

The user policy table 119 shown in FIG. 17B associates the policy requirement 1703 with the determination 1708. In the example shown in FIG. 17B, the determination 1708 is made depending on the device type 1704, the unique information 1705, the hardware information 1706, and the software information 1707 about the newly connected I/O device 115.

In FIG. 17B, the white circles indicate that the information in the updated device information management table 108 is the same as the information in the previous device information management table 108 (the device information management table 108 before update). The cross marks indicate that the information in the updated device information management table 108 is different from the information in the previous device information management table 108 (the device information management table 108 before update).

Specifically, in the case where the device type 1704 of the newly connected I/O device 115 is "HBA", the management server 101 (the user policy processing module 118) determines that the connection is for replacement if the hardware information 1706 and the software information 1707 are the same as the previous ones.

In the case where the device type 1704 of the newly connected I/O device 115 is "NIC", the management server 101 (the user policy processing module 118) determines that the connection is for replacement if at least two of the unique information 1705, the hardware information 1706, and the software information 1707 are the same as the previous ones or if the software information 1707 is the same as the previous one.

As described above, in the example shown in FIG. 17B, the management server 101 (the user policy processing module 118) determines that the connection of the new I/O device 115 is connection for replacement if specific information among the unique information 1705, the hardware information 1706, and the software information 1707, which are used for the OS of each managed server 111 to identify I/O device 115, is the same as the previous one.

Figure 18:
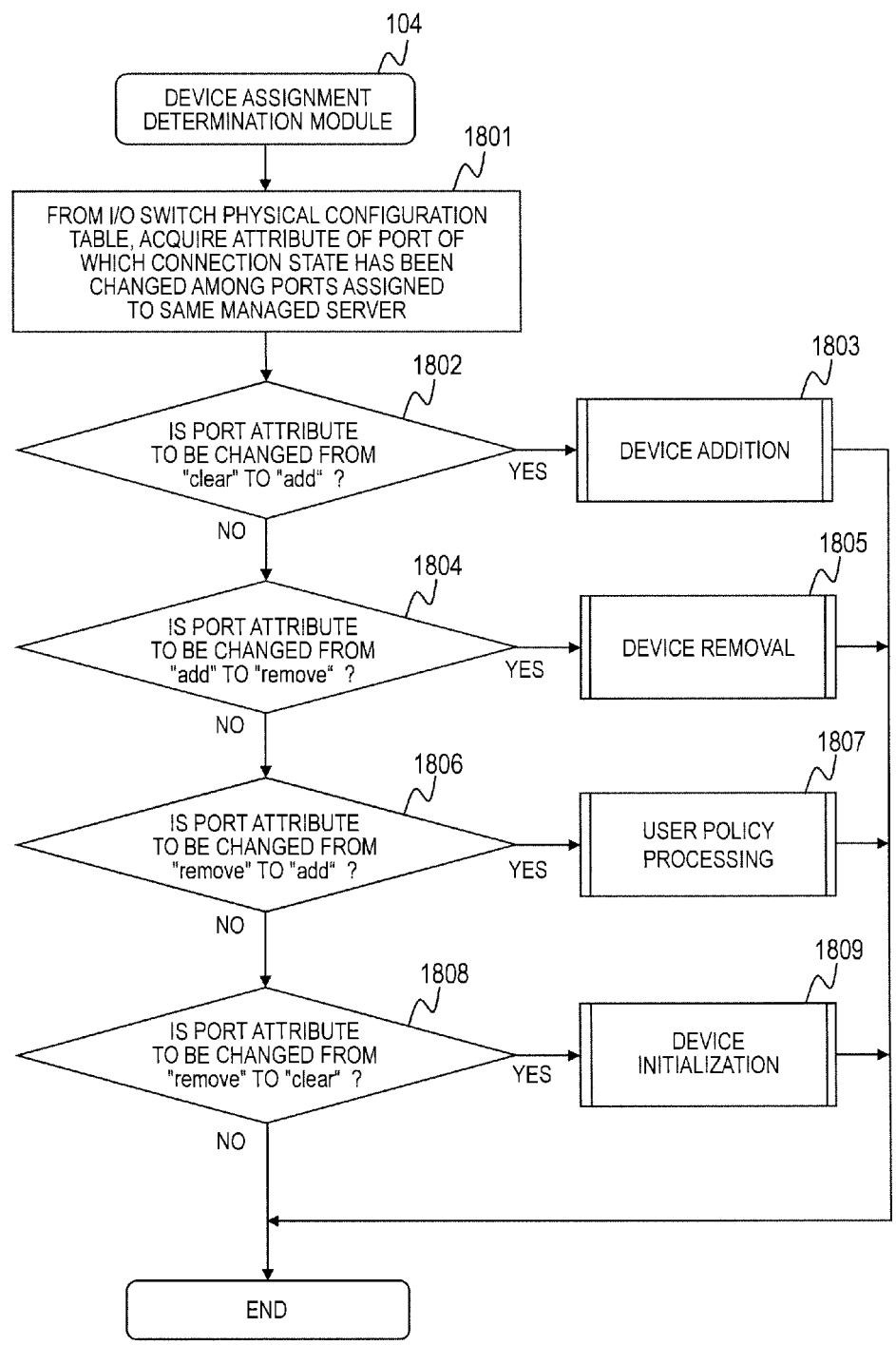
FIG. 18 is a flowchart illustrating control logic of the device assignment determination module in the second embodiment of this invention.

FIG. 18 is a flowchart illustrating control logic of the device assignment determination module 104 in the second embodiment of this invention. The device assignment determination module 104 is invoked by the device information management module 103 to perform the operations described as follows.

First, at Step 1801, the device assignment determination module 104 acquires, from the I/O switch physical configuration table 107a, the attribute 1405 of the port of which connection state has been changed among the ports 113 of the I/O switch apparatus 112 assigned to the same managed server 111 (1801).

Figure 24:
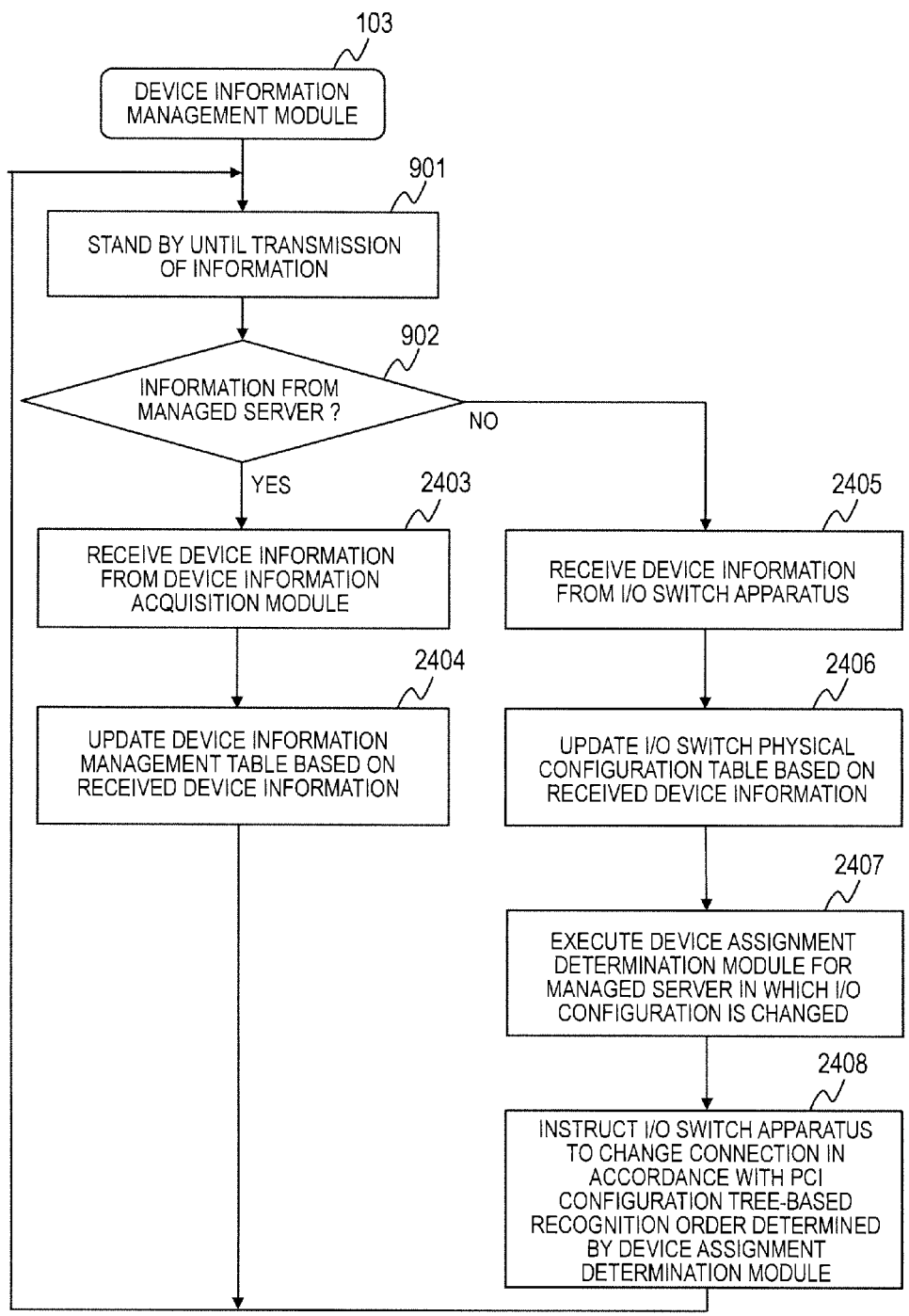
FIG. 24 is a flowchart illustrating control logic of the device information management module in the second embodiment of this invention.

Specifically, the device assignment determination module 104 first refer to the server management table 106 (FIG. 13) to acquire the assigned I/O switch port numbers 405 for the managed server 111 designated at Step 2407 in FIG. 24. Then, it refers to the I/O switch physical configuration table 107a (FIG. 14) to acquire the attribute 1405 of the port of which connection state has been changed, based on the information on the ports having the acquired assigned I/O switch port numbers 405 among the ports listed in the server-side port number 1402.

If the attribute 1405 of the port is to be changed from "clear" to "add" (YES at 1802), the device assignment determination module 104 proceeds to Step 1803 to perform device addition. Details of the device addition are described later with reference to FIG. 19.

Specifically, in the case where a new NIC is connected to the port a, the attribute 1405 of the port a is to be changed from "clear" to "add". Hence, the device assignment determination module 104 performs the device addition.

If the attribute 1405 of the port is to be changed from "add" to "remove" (YES at 1804), the device assignment determination module 104 proceeds to Step 1805 to perform device removal. Details of the device removal are described later with reference to FIG. 20.

Specifically, in the case where an NIC connected to the port b is removed, the attribute 1405 of the port b is to be changed from "add" to "remove". Hence, the device assignment determination module 104 performs the device removal.

If the attribute 1405 of the port is to be changed from "remove" to "add" (YES at 1806), the device assignment determination module 104 proceeds to Step 1807 to perform user policy processing. Details of the user policy processing are described later with reference to FIG. 21.

Specifically, in the case where a new NIC is connected to the port c, the attribute 1405 of the port c is to be changed from "remove" to "add". Hence, the device assignment determination module 104 performs the user policy processing.

If the attribute 1405 of the port is to be changed from "remove" to "clear" (YES at 1808), the device assignment determination module 104 proceeds to Step 1809 to perform device initialization. Details of the device initialization are described later with reference to FIG. 22.

In the other cases (NO at 1802, NO at 1804, NO at 1806, and NO at 1808), the device assignment determination module 104 terminates the processing.

Through the processing described above, the device assignment determination module 104 updates the I/O switch physical configuration table 107a, the I/O switch server connection information table 107b, and the device information management table 108 in accordance with the change in the configuration of I/O devices 115 because of addition, removal, or replacement of an I/O device 115.

In particular, the update of the I/O switch server connection information table 107b determines the order of recognition in the PCI configuration tree. After the update, the I/O switch apparatus 112 recognizes the I/O devices 115 in the order of recognition in the PCI configuration tree determined by the device assignment determination module 104.

Figure 19:
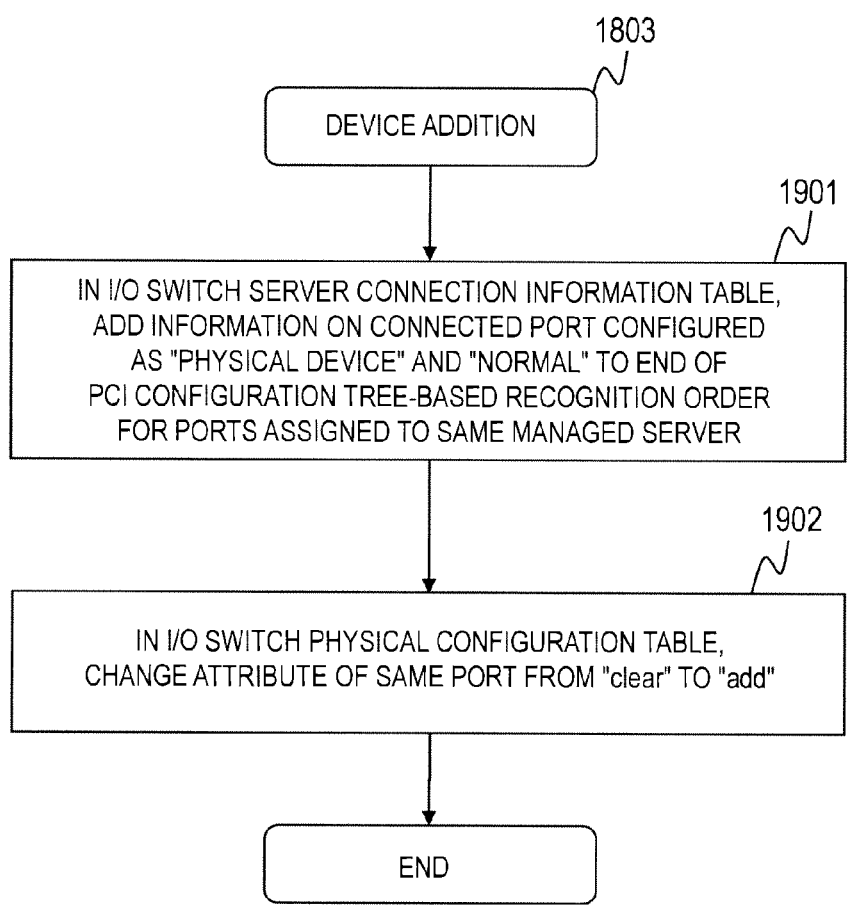
FIG. 19 is a flowchart illustrating control logic for device addition in the second embodiment of this invention.

FIG. 19 is a flowchart illustrating control logic for device addition in the second embodiment of this invention. This section describes details of Step 1803 in FIG. 18.

First, at Step 1901, the device assignment determination module 104 updates the I/O switch server connection information table 107b (FIG. 15) by adding information on the port, namely the port to which a new I/O device 115 has been connected, to the end of the PCI configuration tree-based recognition order 1503 for the ports assigned to the same managed server 111 (1901). The added information is configured as "physical device" for the device state 1505 and "normal" for the attribute 1506.

The ports assigned to the same managed server 111 are the ports 113 of the I/O switch apparatus 112 which are assigned to the managed server 111 designated at Step 2407 in FIG. 24. In the example shown in FIG. 11, the port assigned to the managed server 111 on the left of the drawing is the port 0.

Specifically, in the case where a new NIC is added to the port a, the port a is connected to the port 0 included in the ports 113 (refer to FIG. 14). Meanwhile, in the I/O switch server connection information table 107b (FIG. 15), the last number in the PCI configuration tree-based recognition order 1503 for the port 0 is "2". Accordingly, the device assignment determination module 104 adds information on this port: "a" for the port number 1504, "physical device" for the device state 1505, and "normal" for the attribute 1506, to the entry containing "3" in the PCI configuration tree-based recognition order 1503.

Next, at Step 1902, the device assignment determination module 104 updates the I/O switch physical configuration table 107a (FIG. 14) by changing the attribute 1405 for this port from "clear" to "add" (1902).

Through the processing described above, the device assignment determination module 104 registers the information on the newly connected I/O device 115 in the I/O switch physical configuration table 107a and the I/O switch server connection information table 107b.

Figure 20:
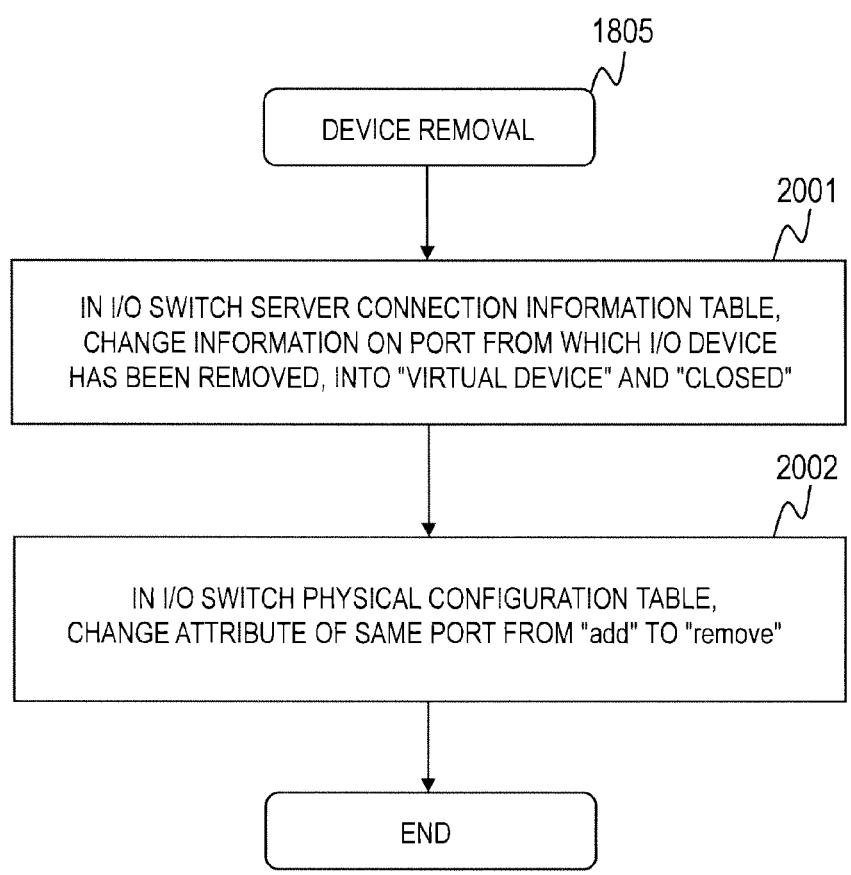
FIG. 20 is a flowchart illustrating control logic for device removal in the second embodiment of this invention.

FIG. 20 is a flowchart illustrating control logic for device removal in the second embodiment of this invention. This section describes details of Step 1805 in FIG. 18.

First, at Step 2001, the device assignment determination module 104 updates the I/O switch server connection information table 107b (FIG. 15) by changing the device state 1505 into "virtual device" and the attribute 1506 into "closed" for the port from which an I/O device 115 has been removed (2001).

Specifically, in the case where an NIC connected to the port b is removed, the device assignment determination module 104 changes the device state 1505 of the entry containing "b" in the port number 1504 into "virtual device" and the attribute 1506 of the same entry into "closed" in the I/O switch server connection information table 107b.

Next, at Step 2002, the device assignment determination module 104 updates the I/O switch physical configuration table 107a (FIG. 14) by changing the attribute 1405 for the same port from "add" to "remove" (2002).

Through the processing described above, the device assignment determination module 104 registers the information on the removed I/O device 115 in the I/O switch physical configuration table 107a and the I/O switch server connection information table 107b.

Figure 21:
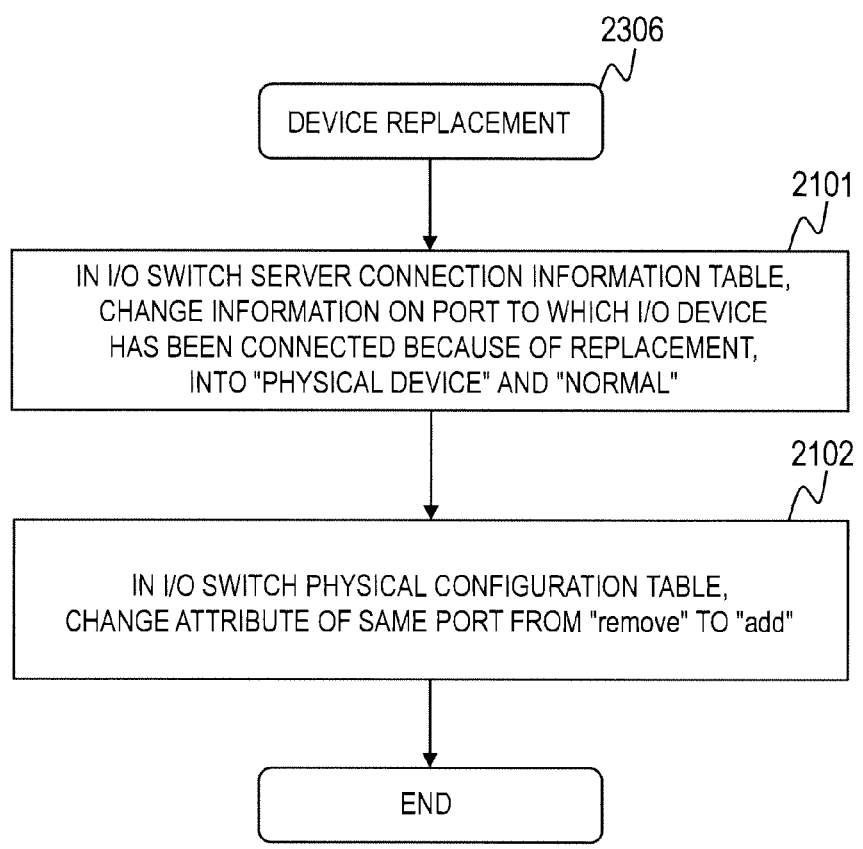
FIG. 21 is a flowchart illustrating control logic for device replacement in the second embodiment of this invention.

FIG. 21 is a flowchart illustrating control logic for device replacement in the second embodiment of this invention. This section describes details of Step 2306 in FIG. 23.

First, at Step 2101, the device assignment determination module 104 updates the I/O switch server connection information table 107b (FIG. 15) by changing the device state 1505 into "physical device" and the attribute 1506 into "normal" for the port to which an I/O device 115 has been connected because of replacement (2101).

Specifically, in the case where an HBA is newly connected to the port c, the device assignment determination module 104 changes the device state 1505 of the entry containing "c" in the port number 1504 into "physical device" and the attribute 1506 of the same entry into "normal" in the I/O switch server connection information table 107b.

Next, at Step 2102, the device assignment determination module 104 updates the I/O switch physical configuration table 107a (FIG. 14) by changing the attribute 1405 for the same port from "remove" to "add" (2102).

Through the processing described above, the device assignment determination module 104 registers the information on the I/O device 115 connected because of replacement in the I/O switch physical configuration table 107a and the I/O switch server connection information table 107b.

Figure 22:
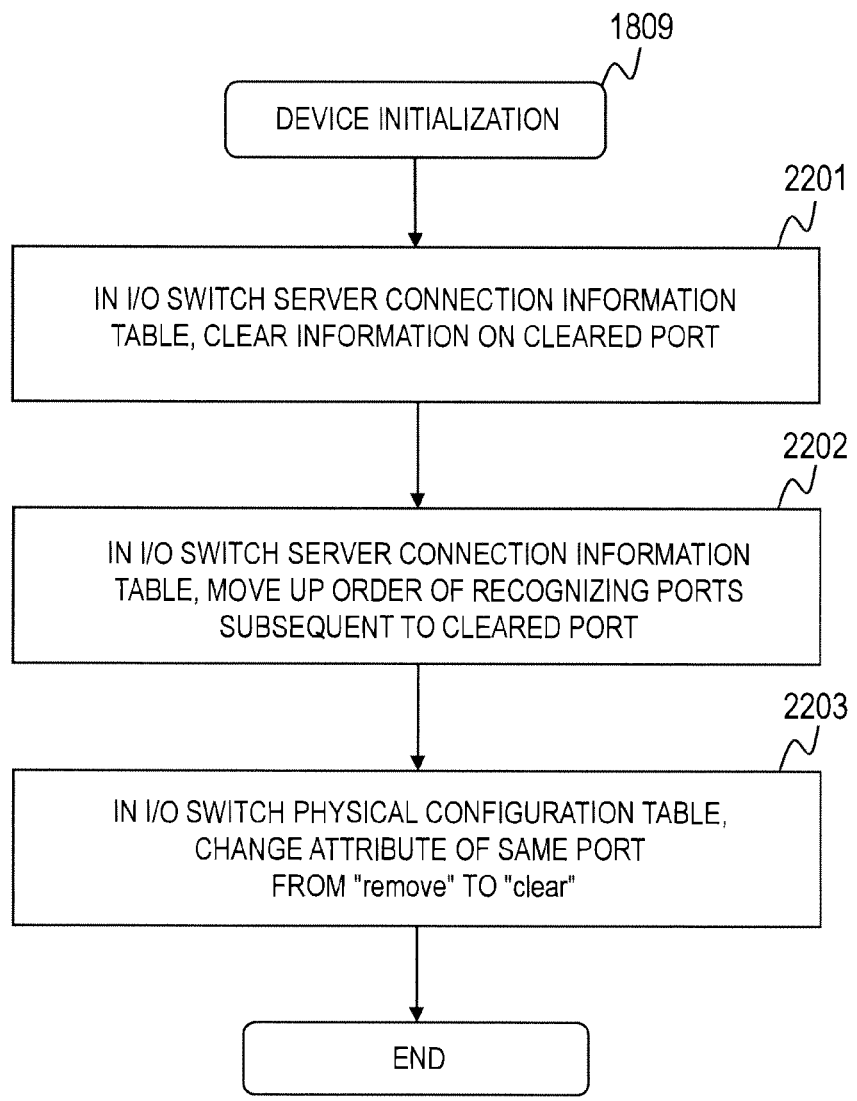
FIG. 22 is a flowchart illustrating control logic for device initialization in the second embodiment of this invention.

FIG. 22 is a flowchart illustrating control logic for device initialization in the second embodiment of this invention. This section describes details of Step 1809 in FIG. 18.

First, at Step 2201, the device assignment determination module 104 updates the I/O switch server connection information table 107b (FIG. 15) by clearing the information (the port number 1504, the device state 1505, and the attribute 1506) on the port to be initialized (2201).

Next, at Step 2202, the device assignment determination module 104 moves up the order of recognizing the ports numbered larger than the port cleared at Step 2201 in the PCI configuration tree-based recognition order 1503 in the I/O switch server connection information table 107b (2202).

Specifically, in the case where information on the port c is cleared, the device assignment determination module 104 moves the information on the port d to the entry containing "1" in the PCI configuration tree-based recognition order 1503 in the I/O switch server connection information table 107b. That is to say, the device assignment determination module 104 replaces the information on the existing ports to the ports numbered one smaller than before one by one.

Then, at Step 2203, the device assignment determination module 104 updates the I/O switch physical configuration table 107a (FIG. 14) by changing the attribute 1405 for this port from "remove" to "clear" (2203).

Through the processing described above, the device assignment determination module 104 registers the information on the cleared I/O device 115 in the I/O switch physical configuration table 107a and the I/O switch server connection information table 107b.

Figure 23:
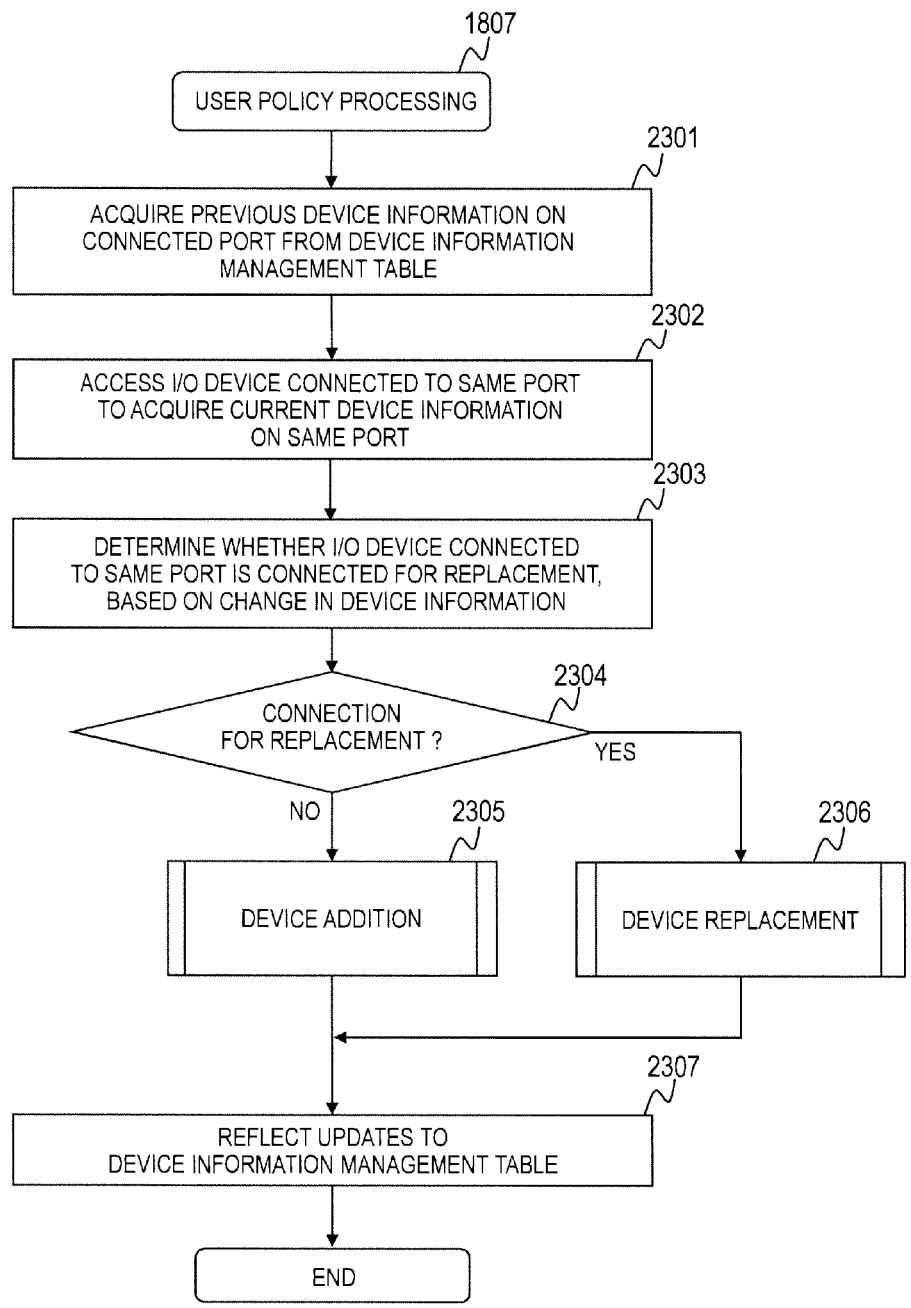
FIG. 23 is a flowchart illustrating control logic of the user policy processing module in the second embodiment of this invention.

FIG. 23 is a flowchart illustrating control logic for user policy processing in the second embodiment of this invention. This section describes details of Step 1807 in FIG. 18.

First, at Step 2301, the device assignment determination module 104 acquires, from the device information management table 108 (FIG. 16), previous device information on the port to which a new I/O device 115 has been connected (2301).

Next, at Step 2302, the device assignment determination module 104 accesses the I/O device 115 connected to the same port to acquire the current device information on the port (2302).

Then, at Step 2303, the device assignment determination module 104 determines whether the connection of the new I/O device 115 is for replacement or not based on the change in the device information (2303). The change in the device information here is the details of the change from the previous device information acquired at Step 2301 to the current device information acquired at Step 2302.

Specifically, at Step 2303, the device assignment determination module 104 invokes the user policy processing module 118. The invoked user policy processing module 118 refers to the user policy management table 119 to determine whether the connection of the new I/O device 115 is for replacement or not based on the change in the device information.

If the connection of the new I/O device 115 is not for replacement, meaning the connection is for new connection (NO at 2304), the device assignment determination module 104 proceeds to Step 2305 to perform device addition (2305). The device addition has been described with FIG. 19.

If the connection of the new I/O device 115 is for replacement (YES at 2304), the device assignment determination module 104 proceeds to Step 2306 to perform device replacement (2306). The device replacement has been described with FIG. 21.

Then, at Step 2307, the device assignment determination module 104 reflects the updates to the device information management table 108 (FIG. 16) (2307).

Through the processing described above, when a new I/O device 115 is connected, the device assignment determination module 104 determines whether the connection of the new I/O device 115 is for replacement or not and updates the I/O switch physical configuration table 107a, the I/O switch server connection information table 107b, and the device information management table 108 in accordance with the determination.

FIG. 24 is a flowchart illustrating control logic of the device information management module 103 in the second embodiment of this invention. The device information management module 103 performs the operations described as follows to manage the information stored in the server management table 106, the I/O switch physical configuration table 107a, the I/O switch server connection information table 107b, and the device information management table 108. In the following description, the same elements as those in FIG. 9 are denoted by the same reference signs and repetitive explanation is omitted as appropriate.

If the device information management module 103 proceeds to Step 2403, it receives information representing the logical configuration of I/O devices 115 acquired by the device information acquisition module 120 of the managed server 111 (2403).

Then, the device information management module 103 updates the device information management table 108 based on the received information representing the logical configuration of I/O devices 115 (2404). Then, the device information management module 103 returns to Step 901 to repeat the processing.

If the device information management module 103 proceeds to Step 2405, it receives information representing the physical configuration of I/O devices 115 acquired by the management program in the I/O switch apparatus 112 (2405).

Then, at Step 2406, the device information management module 103 updates the I/O switch physical configuration table 107a based on the received information representing the physical configuration of I/O devices 115 (2406). Specifically, the device information management module 103 updates the fields of the I/O switch identifier 1401 through the connected device 1404 in the I/O switch physical configuration table 107a. The field of the attribute 1405 is updated at the subsequent Step 2407.

Then, at Step 2407, the device information management module 103 invokes the device assignment determination module 104 to execute the module for the managed server 111 in which the I/O configuration is changed (2407). The detailed operations of the invoked device assignment determination module 104 are illustrated in FIG. 18. The invoked device assignment determination module 104 determines the order of recognition in the PCI configuration tree in accordance with the change in the configuration of I/O device 115.

It should be noted that, at Step 2407, the device information management module 103 may designate the managed server 111 for which the I/O configuration is changed based on an instruction received from the user via the user interface module 105 in the management server 101, like in the foregoing first embodiment.

Then, at Step 2408, the device information management module 103 issues an instruction to change (reconfigure) the PCI configuration tree in accordance with the order of recognition in the PCI configuration tree determined by the device assignment determination module 104 to the I/O switch apparatus 112 (2408). The I/O switch apparatus 112 changes the PCI configuration tree based on the instruction. Then, the device information management module 103 returns to Step 901 to repeat the processing.

Through the processing described above, the device information management module 103 manages the information stored in the server management table 106, the I/O switch physical configuration table 107a, the I/O switch server connection information table 107b, and the device information management table 108.

As described the second embodiment of this invention above, the consistency in device names of the I/O devices 115 can be assured through cooperation of the management server 101 with the I/O switch apparatus 112, even if the device configuration is changed because of addition, deletion, or replacement of an I/O device 115.

As set forth above, this invention has been described in detail with reference to the accompanying drawings; however, this invention is not limited to such specific configurations but include various modifications and equivalent configuration within the scope of the appended claims.

What is claimed is:

1. A computer system comprising:
   an I/O switch connected to a computer, the I/O switch configured to change connections between the computer and a plurality of I/O devices; and
   a management server configured to manage configuration of the plurality of I/O devices, the management server including a processor configured to execute a program and a memory configured to store the program to be executed by the processor,
   wherein, with respect to existing I/O devices connected to the I/O switch, the management server is configured to store information representing logical configuration of the existing I/O devices recognized by an OS of the computer and information representing physical configuration of the existing I/O devices managed by the I/O switch in the memory,
   wherein information representing logical configuration includes physical device names of each I/O device, logical device names assigned to each I/O device, hardware identification information, and software identification information,
   wherein information representing physical configuration includes downstream port numbers and server-side port numbers,
   wherein, upon receipt of a notice indicating a change in the configuration of the existing I/O devices from the I/O switch, the management server is configured to change the physical configuration of the existing I/O devices after the change in the configuration to be matched with the logical configuration of the exiting I/O devices and instruct the I/O switch to change the connections in accordance with the changed physical configuration,
   wherein, upon receipt of a notice indicating connection of a new I/O device to the I/O switch from the I/O switch, the management server is configured to change physical configuration of the new I/O device and the existing I/O devices to be matched with the logical configuration of the existing I/O devices,
   wherein the information representing the logical configuration of existing I/O devices includes information on computer-side ports of the I/O switch which are assigned to the existing I/O devices,
   wherein, upon receipt of a notice indicating connection of a new I/O device to the I/O switch from the I/O switch, the management server is configured to assign the new I/O device to a free Port to be positioned subsequent to the end of a sequence of ports assigned to the existing I/O devices, while keeping the sequence of the ports, to change physical configuration of the new I/O device and the existing I/O devices, and
   wherein, in a case where the existing I/O devices include I/O devices of the same type as the type of the new I/O device, the management server is configured to assign the new I/O device to a free port to be positioned subsequent to the end of the sequence of ports assigned to the existing I/O devices of the same type, while keeping the sequence of the ports.

2. A computer system according to claim 1,
   wherein, in a further case where no free port exists that is numbered larger than the largest value among the numbers of the ports assigned the I/O devices of the same type and a free port exists that is numbered smaller than one of the numbers of the assigned ports, the management server is configured to shift each of the ports assigned the I/O devices of the same type toward the smallest numbered port by one and assign the new I/O device to a port positioned at the end of the sequence of the ports.

3. A computer system comprising:
   an I/O switch connected to a computer, the I/O switch configured to change connections between the computer and a plurality of I/O devices; and
   a management server configured to manage configuration of the plurality of I/O devices, the management server including a processor configured to execute a program and a memory configured to store the program to be executed by the processor, wherein, with resect to existing I/O devices connected to the I/O switch, the management server is configured to store information representing logical configuration of the existing I/O devices recognized by an OS of the computer and information representing physical configuration of the existing I/O devices managed by the I/O switch in the memory, wherein information representing logical configuration includes physical device names of each I/O device, logical device names assigned to each I/O device, hardware identification information, and software identification information, wherein information representing physical configuration includes downstream port numbers and server-side port numbers, wherein, upon receipt of a notice indicating a change in the configuration of the existing I/O devices from the I/O switch, the management server is configured to change the physical configuration of the existing I/O devices after the change in the configuration to be matched with the logical configuration of the existing I/O devices and instruct the I/O switch to change the connections in accordance with the chanted physical configuration, and wherein, upon receipt of a notice indicating removal of an I/O device included in the existing I/O devices from the I/O switch, the management server is configured to reassign a virtual device to the port assigned the removed I/O device to prevent the logical configuration of the existing I/O devices from being changed.

4. A management computer in a computer system including an I/O switch connected to a computer configured to change connections between the computer and a plurality of I/O devices and the management serve configured to manage configuration of the plurality of I/O devices, the management server comprising:

a processor configured to execute a program; and
a memory configured to store the program to be executed by the processor,
wherein, with respect to existing I/O devices connected to the I/O switch, the management server is configured to store information representing logical configuration of the existing I/O devices recognized by an OS of the computer and information representing physical configuration of the existing I/O devices managed by the I/O switch in the memory, wherein information representing logical configuration includes physical device names of each I/O device, logical device names assigned to each I/O device, hardware identification information, and software identification information, wherein information representing physical configuration includes downstream port numbers and server-side port numbers, wherein, upon receipt of a notice indicating a change in the configuration of the existing I/O devices from the I/O switch, the management server is configured to change the physical configuration of the existing I/O devices after the change in the configuration to be matched with the logical configuration of the existing I/O devices and instruct the I/O switch to change the connections in accordance with the changed physical configuration, and wherein, upon receipt of a notice indicating removal of an I/O device included in the existing I/O devices from the I/O switch, the management server is configured to reassign a virtual device to the port assigned the removed I/O device to prevent the logical configuration of the existing I/O devices from being changed.

5. A management server according to claim 4,
wherein, in a case where the existing I/O devices include I/O devices of the same type as the type of the new I/O device, the management server is configured to assign the new I/O device to a free port to be positioned subsequent to the end of the sequence of ports assigned to the existing I/O devices of the same type, while keeping the sequence of the ports.

6. A management server according to claim 5,
wherein, in a further case where no free port exists that is numbered larger than the largest value among the numbers of the ports assigned the I/O devices of the same type and a free port exists that is numbered smaller than one of the numbers of the assigned ports, the management server is configured to shift each of the ports assigned the I/O devices of the same type toward the smallest numbered port by one and assign the new I/O device to a port positioned at the end of the sequence of the ports.

* * * * *